United States Patent
Akamatsu et al.

[11] Patent Number: 5,886,888
[45] Date of Patent: *Mar. 23, 1999

[54] VOLTAGE SOURCE TYPE POWER CONVERTING APPARATUS

[75] Inventors: Masahiko Akamatsu; Shinzo Tamai; Fuminori Nakamura, all of Amagasaki; Shotaro Murakami, Kobe; Tomohiko Aritsuka, Kobe; Takeaki Asaeda, Kobe, all of Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 638,054

[22] Filed: Apr. 26, 1996

[30] Foreign Application Priority Data

Apr. 27, 1995 [JP] Japan .................................. 7-103691

[51] Int. Cl.$^6$ ................................................. H02M 7/515
[52] U.S. Cl. ............................................. 363/65; 363/71
[58] Field of Search ........................................ 363/64–71

[56] References Cited

U.S. PATENT DOCUMENTS

| | | | |
|---|---|---|---|
| 3,970,914 | 7/1976 | Salzmann et al. | 321/2 |
| 4,143,414 | 3/1979 | Brewster et al. | 363/65 |
| 4,532,581 | 7/1985 | Miyairi | 363/64 |
| 5,124,904 | 6/1992 | Paice | 363/70 |
| 5,311,419 | 5/1994 | Shires | 363/71 |
| 5,337,227 | 8/1994 | Stacey et al. | 363/71 |
| 5,515,264 | 5/1996 | Stacey | 363/71 |
| 5,541,830 | 7/1996 | Moore et al. | 363/69 |
| 5,543,771 | 8/1996 | Levin | 336/10 |
| 5,610,452 | 3/1997 | Shimer et al. | 363/65 |
| 5,625,545 | 4/1997 | Hammond | 363/65 |
| 5,638,263 | 6/1997 | Opal et al. | 363/65 |
| 5,646,511 | 7/1997 | Akamatsu et al. | 323/207 |
| 5,666,277 | 9/1997 | Bjorklund et al. | 363/64 |
| 5,731,971 | 3/1998 | Owen | 363/154 |

Primary Examiner—Peter S. Wong
Assistant Examiner—Derek J. Jardieu
Attorney, Agent, or Firm—Sughrue, Mion, Zinn, Macpeak & Seas, PLLC

[57] ABSTRACT

A voltage source type power converting apparatus having voltage source type power converter units and phase-shifting transformers. The transformers have either a common multiple-phase primary winding or a group of parallel connected multiple-phase primary windings, either of which being connected in parallel or series to a multiple-phase AC system. The transformer further include a group of multiple-phase secondary windings with phase differences with respect to each other and which are connected to voltage source type power converter units. The voltage source type power converter units are operated with the phase differences. Accordingly, the construction of the multiplexing phase-shifting transformer is simple, and fundamental electric variables can be controlled by a simple phase controlling operation. In addition, a higher harmonic defect of the AC system can be reduced, and the DC voltage can be easily raised.

7 Claims, 18 Drawing Sheets

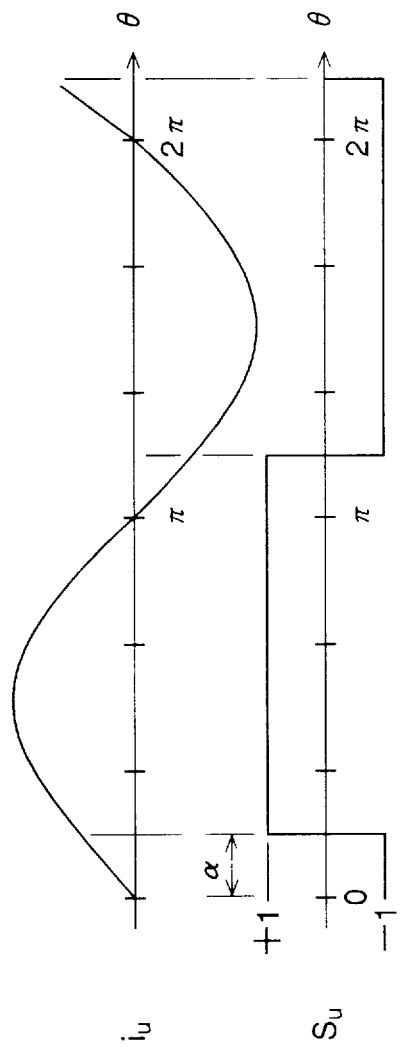
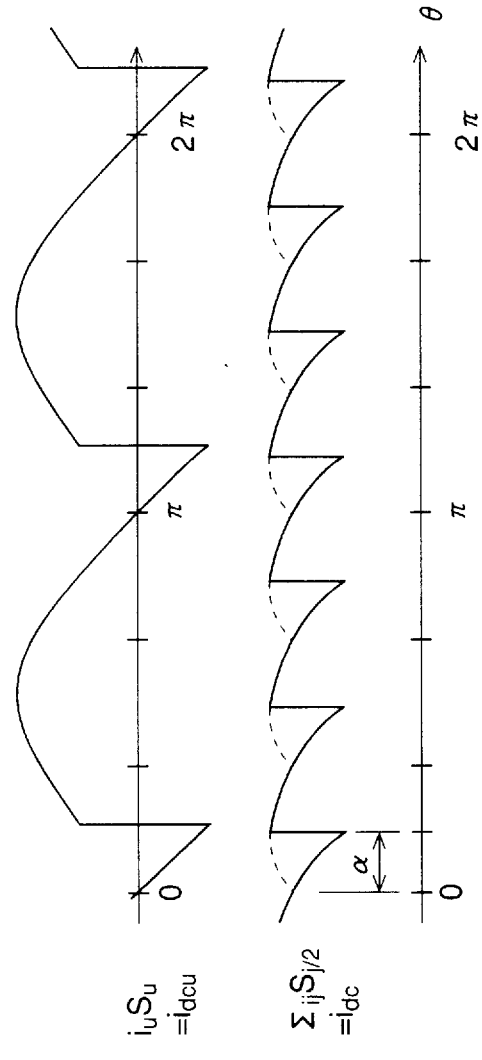
FIG.3(a)
FIG.3(b)
FIG.3(c)
FIG.3(d)

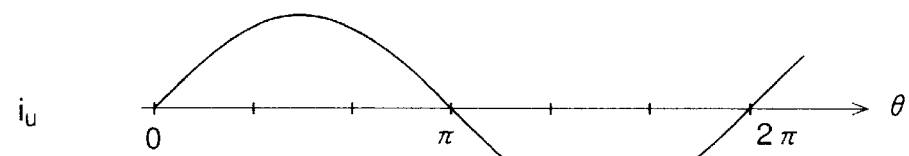
FIG.4(a) $i_u$
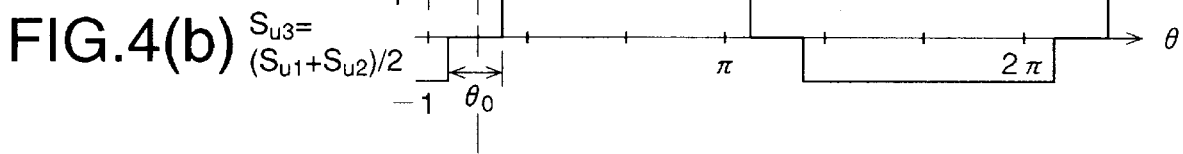
FIG.4(b) $S_{u3}=(S_{u1}+S_{u2})/2$
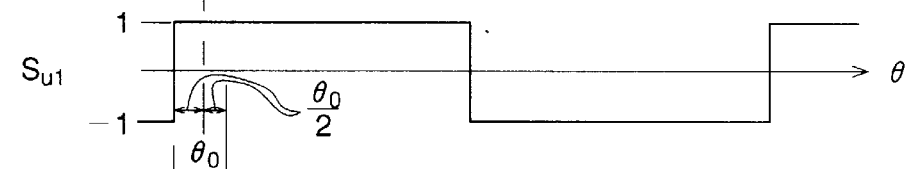
FIG.4(c) $S_{u1}$
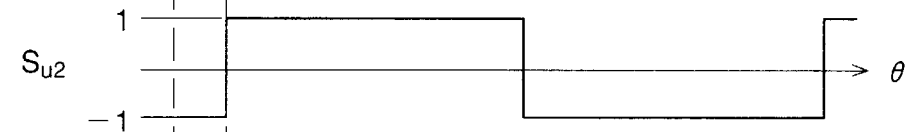
FIG.4(d) $S_{u2}$
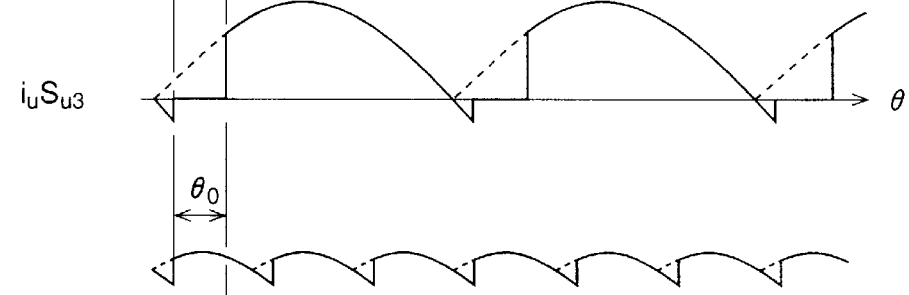
FIG.4(e) $i_u S_{u3}$
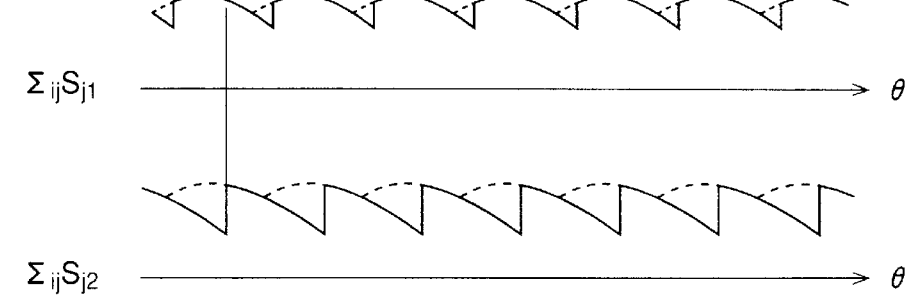
FIG.4(f) $\Sigma_{ij} S_{j1}$
FIG.4(g) $\Sigma_{ij} S_{j2}$
FIG.4(h) $\Sigma_{ij} S_{j3} = i_{dc}$
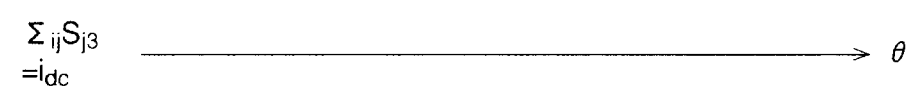

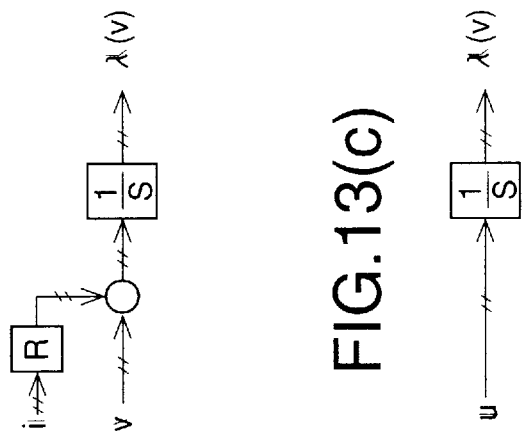
FIG.13(b)
FIG.13(c)
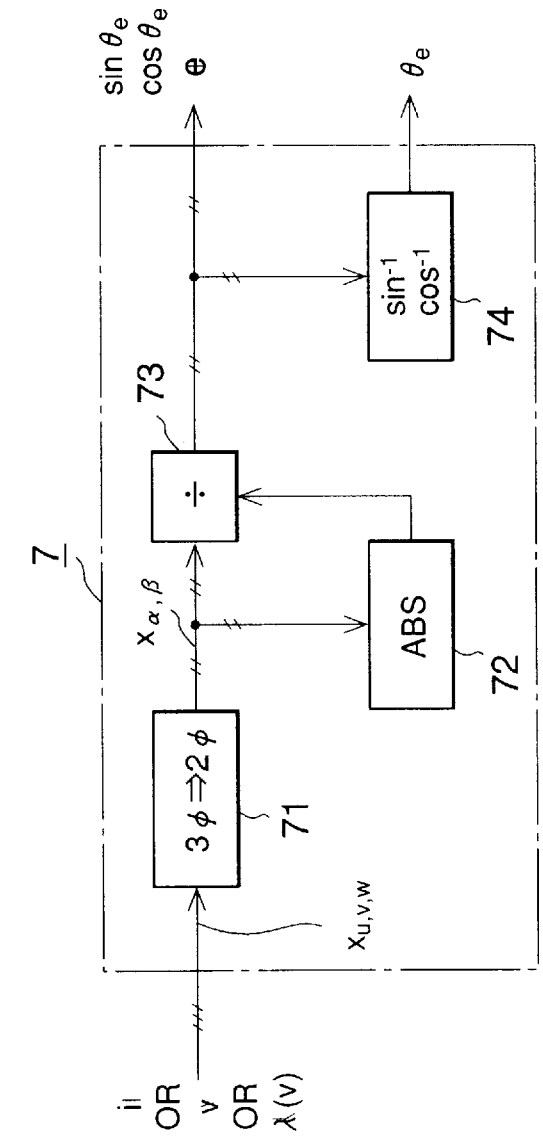
FIG.13(a)

$\theta_{out} = \theta_1 + \psi_1 - \theta_2 - \psi_2$

FIG.18(a)
PRIOR ART
FIG.18(b)
PRIOR ART
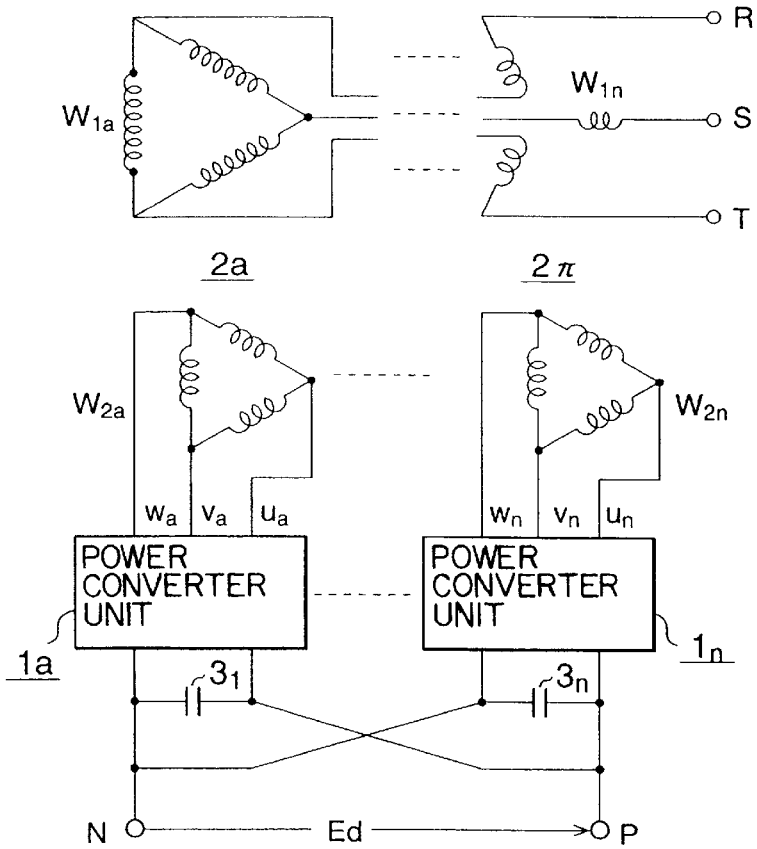
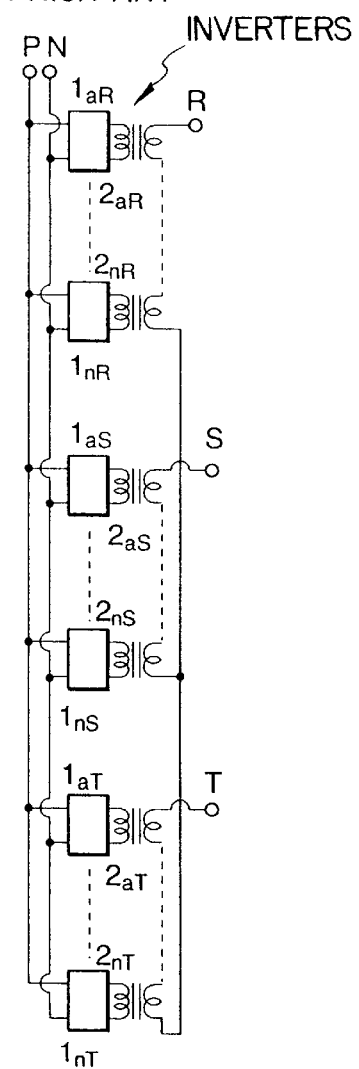

VOLTAGE SOURCE TYPE POWER CONVERTING APPARATUS

BACKGROUND OF THE INVENTION

1. Field of the Invention

The present invention relates to a voltage source type power converting apparatus for converting power between a multiple-phase AC system and a DC system.

2. Description of the Related Art

In a conventional power transmission and distribution system, a power converting apparatus is disposed at, for example, a 3.3 kV to 500 kV substation or a switching station. The power converting apparatus is operated in a reactive current supply mode or a reactive current consumption so that the transient stability, dynamic stability, static stability, and so forth are improved and hence, the system voltage is maintained constant.

To establish DC transmission or DC linkage between AC systems, a plurality of self-exciting (self-commutating) power converting apparatuses are used so as to control the power interchange and the power flow. Thus, the reliability of the system is improved. In addition, outage propagation can be prevented, and the system reactive power consumption can be reduced.

A power converting apparatus can be disposed in a reception and substation facility for a plant, an electric railway, or the like. The power converting apparatus is operated in a reactive current supply mode and a reactive current consumption mode so as to control the reactive power and stabilize the voltage.

In an electric railway, a power converting apparatus is used for operating electric cars in both a motoring mode and regenerative breaking mode. In addition, in a linear motor railway, the power converting apparatus is used for various control operations.

Furthermore, in general industrial fields, a power converting apparatus is used in a constant-voltage- constant-frequency (CVCF) power supply apparatus so as to maintain the quality of the power supply necessary for operating, for example, a computer.

Conventional circuits for reducing higher harmonics (harmonics neutralization) that adversely affect such power converting apparatuses will now be described with reference to the accompanying drawings.

FIGS. 18(a) and 18(b) show conventional voltage source type power converting apparatuses (hereinafter, "power converting apparatuses"). The circuits include voltage source type power converter units 1a to in (hereinafter, "power converter units"), and phase-shifting transformers 2a to 2n that have phase-shifting primary windings W1a to W1n and secondary windings W2a to W2n, respectively. The phase-shifting primary windings W1a to W1n are connected to AC system side terminals R, S, and T. The secondary windings W2a to W2n are connected to the AC terminals ua to wn of the power converter units 1a to 1n as shown. DC capacitors 3l to 3n are coupled to the power converter units 1a to 1n, along with DC terminals P and N, as illustrated.

The power converter units 1a to 1n are normally two-level inverters (converters) or three-level inverters (converters) as shown in FIGS. 19(a) and 19(b). DC capacitors 3P and 3N are connected in series to the DC terminals P and N, respectively. Static switches 4a to 4d are also connected in series between terminals P and N. In this circuit, neutral point clamp diodes 4e and 4f are connected together at a point between capacitors 3P and 3N, with the other end of diode 4e being connected at a point between switches 4a and 4b and the other end of diode 4f being connected at a point between switches 4c and 4d.

FIG. 19(c) shows a detailed circuit construction of the static switches 4 and 4a–4d. Each of the static switches 4 and 4a–4d has switch elements with an active switch function (self off switch function) in at least one direction. In other words, the static switch has an active switch element 4" in one direction and a passive diode 4' in the other direction. Examples of the switch element 4", which has the active switch function in at least one direction, are gate turn-off thyristors (such as GTO, MCT, and EST) as shown in FIG. 19(d), or transistors (such as BJT, IGBT, and FET).

Turning back to FIG. 18(b), inverters 1aR to 1nT are single-phase bridge type two-level inverters (converters), or three-level inverters (converters) thereof, as shown in FIGS. 19(a) and 19(b), in which the circuit for one phase is omitted. Transformers 2aR to 2nT are single-phase transformers of which primary windings on the AC system side are connected in series. As another example, a forced commutation thyristor type voltage type power converter can also be used.

Next, operation of the circuits shown in FIGS. 18(a) and 18(b) will be described with reference to a DC-to-three-phase-AC power converting apparatus.

With regard to the circuit shown in FIG. 18(a), the operation when a DC voltage Ed is applied to DC terminals N and P and a three-phase AC is obtained from AC system terminals R, S, and T will be described. In the case of one power converter unit 1a, (6n±1)th order higher harmonics inevitably take place. When n power converter units 1a to 1n with phase differences of 60°/n are controlled in six steps and the phases of the primary windings W1a to W1n of the phase-shifting transformers 2a to 2n are shifted against the fundamental wave, higher harmonics of lower than (6n±1)th orders are set off. Thus, the higher harmonics are reduced.

Likewise, in the circuit shown in FIG. 18 (b), the operation when a DC voltage Ed is applied to the DC terminals N and P and a single-phase AC voltage that has been pulse-width modulated (PWM) is generated by each of the inverters 1aR to 1nR, 1aS to 1nS, and 1aT to 1nT will be described. In this example, the phases of triangular carriers that are pulse-width modulated in a-th to n-th inverter units are shifted. The output voltages are achieved by windings connected in series for each phase of the transformers 2aR to 2nR, 2aS to 2nS, and 2aT to 2nT. Since the phases of higher harmonics that take place by switching operation corresponding to the phases of the carriers are also shifted, higher harmonics due to the pulse width modulation are reduced.

As described above, in the circuit shown in FIG. 18(a), to reduce higher harmonics of the composite primary voltage, AC voltages that are output from the power converter units 1a to in with phase differences are composited in series, and the primary windings of the transformers are connected in series. However, since the terminals R, S, and T are connected to the AC system side, it becomes difficult to insulate the series connections of leads (for example, bushings) and the primary windings. In particular, when the AC system uses a relatively high voltage as with a power system, since the insulation grade should be raised, the construction becomes complicated and uneconomical.

In an extreme case, if each of the primary windings (W1a) to (W1n) should be insulated for several hundred kV, the size of the bushings becomes large. To solve this problem, if all portions are housed in the same insulation vessel (a SF6 vessel or an insulation oil tank), the construction becomes impractical with regard to its size, weight, strength, and ability to be transported. To solve this problem, the voltages applied to the terminals R, S, and T are limited to several kV to several ten kV. In addition, an insulation transformer (main transformer) for a hundred and several ten kV or higher is additionally used. In other words, the phase-shifting transformers 2a to 2n cannot be economically connected to the power system.

In the circuit shown in FIG. 18(b), in consideration of the total economical characteristics and availability for an imbalanced three-phase power transmission system, the single-phase power converter units 2aR to 2nR, 2aS to 2nS, and 2aT to 2nT are applied to the three-phase AC system so that each phase of the three-phase AC system can be independently controlled. In this case, to counteract against higher harmonics for each phase, PWM timings (for example, PWM carriers or phases) of individual single-phase power converter units are shifted without the need to shift the phases of the transformers. In addition, the transformers for the phases R, S, and T are housed in the same insulation vessel.

Although an insulation transformer (main transformer) is additionally required, the transformers 2a to 2n for the converters are housed in three insulation vessel and magnetic core portions. The windings and connections are hence unified. However, since the primary windings on the AC system side are connected in series, the currents thereof are the same. Also, to counteract against higher harmonics, since the phases (the PWM timings, for example, PWM carriers) of the single-phase power converter units are shifted, the phase of the voltage of the fundamental wave is shifted. Thus, the active power (thus, a DC side link current) of each of the single-phase power converter units is imbalanced.

Consequently, the DC side terminals P and N must be connected in parallel and cannot be connected in series. In addition, due to this restriction, the DC voltage cannot be raised, for example. Therefore, it is difficult to raise the link voltage to several hundred kV or several ten kV. In other words, although the DC transmission by the voltage source type power converting apparatus provides a good countermeasure against the reactive power, since the total DC voltage should be decreased, the total DC current necessary for transmitting the same power becomes very high (i.e., the long distance transmission line must therefore be large and accordingly, the resistance loss becomes too large). Thus, the apparatus of this type cannot be effectively used.

In the conventional voltage source type power converting apparatus and the power system controlling apparatus, to reduce higher harmonics of multiplexed transformers, anti-power-converter side windings (primary windings) of transformers for converters connected to the multiple-phase AC system are connected in series. Thus, the construction of the transformers for use with the converters becomes complicated.

In addition, in the conventional voltage source type power converting apparatus, when the construction of the transformers for use with the converters is simplified, the power provided by the power converter units become unbalanced. Thus, since the power converter units on the DC link side cannot be connected in series, it is difficult to raise the total DC voltage. Consequently, the apparatus is not suitable for DC transmission. In addition, the capacity cannot be increased in a DC linkage system, reactive power compensation system, and power system control apparatus.

In a power system controlling apparatus that connects anti-power-converter side windings (primary windings connected in series) to a high voltage power system, the windings should be insulated for a high voltage. Thus, an insulation transformer (main transformer) for insulation of a high voltage is additionally required.

SUMMARY OF THE INVENTION

Accordingly, an object of the invention is to provide a voltage source type power converting apparatus for alleviating a higher harmonic defect against an AC system without need to serially connect primary windings to the AC system.

To achieve this object, a voltage source type power converting apparatus according to a first embodiment of the invention includes a common multiple-phase primary winding or a group of parallel connected multiple-phase primary windings connected to a multiple-phase AC system. Secondary windings having phases differences with respect to the primary winding are connected to AC terminals of power converter units, which are typically operated at phase differences with respect to each other.

Hence, the primary windings associated with their respective individual power converter units that are operated with phase differences are not connected in series. Thus, voltage components of the power converter units are not combined in series. Also, the connections between the primary windings are less complicated. Additionally, since the primary windings are not connected in series, higher harmonic currents of output voltages of the power converter units flow on the secondary winding side.

Furthermore, the number of phase differences of the higher harmonic currents is equal to the harmonic orders times the phase difference of the fundamental wave. In addition, since the phase shifting operation of occurs due to the phase-shifting transformers, predetermined orders of higher harmonics are set off in the primary windings. Thus, the higher harmonic currents and the higher harmonic voltages are significantly reduced in the AC system, and the higher harmonic currents that are set off are circulated among the power converter units through the secondary windings. Therefore, the higher harmonic currents are not present in the common primary winding, and the higher harmonic currents that are circulated among the power converter units are suppressed by leakage reactance among the secondary windings.

Another object of the present invention is to provide a voltage source type power converting apparatus for alleviating a higher harmonic defect against an AC system without need to serially connect primary windings to lines of the AC system.

To achieve this object, a voltage source type power converting apparatus according to a second embodiment of the invention includes a common multiple-phase primary winding or a group of parallel connected multiple-phase primary windings connected in series to lines of a multiple-phase AC system. Secondary windings having phases differences with respect to the primary winding are connected to AC terminals of power converter units that are operated with phase differences.

That is, the primary windings associated with the respective individual power converter units are not connected in series. Accordingly, voltage components of the power converter units are not combined in series. Hence, the connections of the primary windings are less complicated. In addition, the operation for setting off predetermined orders of higher harmonics is the same as in the first embodiment.

Higher harmonic currents that are not set off are suppressed by a line serial reactance of the AC system. In the long distance large power transmission, the relationship of line reactance to the fundamental wave is as many as several ten % to a hundred and several ten %. In addition, since the reactance against the higher harmonics is several times higher than the reactance of the fundamental wave, higher harmonic currents can be significantly reduced.

A further object of the invention is to provide a voltage source type power converting apparatus for controlling fundamental electric variables such as current, voltage, power, and so forth, so as to easily control phases under a constant pulse width condition including a non-PWM.

To achieve this object, the present invention provides a voltage source type power converting apparatus having power converter units whose phases are controlled corresponding a reference phase signal which is based on both the reference phase of the AC system or the primary windings and the phase differences of the phase-shifting transformers. In addition, the switching phases of the power converter units are added or subtracted. Thus, DC currents are controlled by a mechanism that synchronously rectifies AC currents (I dc=k Iac cos α, with Iac representing an AC current vector that flows from the AC system to the power converter unit).

Furthermore, when parallel connected multiple-phase primary windings are used, the power is controlled corresponding to the phase differences of the fundamental waves of the AC system voltage and the power converter voltage as P=(VsVc/X) sin δ, with Vs representing a rear voltage vector on the AC system side, Vc representing a voltage vector at an AC terminal of a power converter unit, X representing the reactance of the fundamental wave on the AC system side, and δ being a phase delay angle of Vc with respect to Vs. Using a serial connection, on the other hand, the back ground voltage V's of the AC system is given by a vector difference between the power transmission terminal voltage Vs and the power reception terminal voltage Vr as [V's=(Vs−Vr)]. The rear voltage is applied to the primary windings.

Thus, the power is controlled as P=(V's Vc/X) sin δ. In both the parallel connection and the serial connection arrangements, the power is controlled corresponding to phase differences of fundamental waves of the AC current and the voltage of the power converter unit as P=Iac Vc cos α, with a being a phase delay angle of Vc with respect to an AC current Iac. The DC voltage and thereby the AC voltage of the power converter unit that is proportional thereto is dependently controlled because the DC current or the power is stored in the. DC link capacitor. Thus, by using a simple device for adding or subtracting the switching phase, the voltage, the DC current, or the power of the power converter unit can be controlled. Thus, the voltage, the current, and the power on the AC side can be controlled. In other words, fundamental electric variables can be controlled easily.

The invention also provides a controlling method and apparatus for suppressing imbalanced voltages of power converter units due to deviations thereof, and for controlling a total DC voltage or an average DC voltage when DC terminals of the power converter units are connected in series so as to obtain a high DC voltage.

To achieve this object, the present invention provides a voltage source type power converting apparatus including a reference phase signal generating device which operates based on reference phase information received from the AC system and the phase difference. The switching phase of each of the power converter units is controlled corresponding to the reference phase signal.

In addition, the power converting apparatus includes a phase adding/subtracting device for adding or subtracting the switching phase. DC terminals on the DC link side of the power converter units are connected in series so as to obtain a high DC voltage, and the power apparatus further includes a controlling device for controlling the sum of DC voltages on the DC link side of the power converter units and for controlling an imbalanced component. The switching phase of each of the power converter units is added or subtracted corresponding to the composite value of the output signal of the controlling device for the sum of the DC voltages and for the imbalanced component. Accordingly, the imbalanced voltages of the power converter units due to deviations thereof are suppressed. Also, the total DC voltage and the average DC voltage can be controlled.

A further object of the invention is to provide a controlling method and apparatus for suppressing imbalanced DC currents of power converter units due to deviations thereof, and for controlling a total DC current or an average DC current when DC terminals of the power converter units are connected in parallel.

To achieve this object, the present invention provides a voltage source type power converting apparatus including a reference phase signal generating device which operates based on reference phase information received from the AC system and the phase difference. The switching phase of each of the power converter units is controlled corresponding to the reference phase signal.

In addition, the power converting apparatus includes a phase adding/subtracting device for adding or subtracting the switching phase. DC terminals on the DC link side of the power converter units are connected in parallel so as to increase the DC current capacity, an the power converting apparatus further includes a controlling device for controlling the sum of DC currents on the DC link side of the power converter units and for controlling an imbalanced component. The switching phase of each of the power converter units is added or subtracted corresponding to the composite value of the output signal of the controlling device for the sum of the DC currents and for the imbalanced component. Hence, the imbalanced DC currents of the power converter units due to deviations thereof are suppressed, and the total DC current and the average DC current can be controlled.

A further object of the invention is to provide a controlling method and apparatus for suppressing transiently imbalanced DC currents of power converter units due to deviations thereof so as to suppress factors of the imbalanced voltages and for controlling a total DC current or an average DC current when DC terminals of the power converter units are connected in series.

To achieve this object, the present invention provides a voltage source type power converting apparatus including a reference phase signal generating device and phase adding/subtracting device as discussed above, and the switching phase of each of the power converter units is controlled corresponding to the reference phase signal. DC terminals on the DC link side of the power converter units are connected in series to raise the total DC voltage.

The power converting apparatus further includes a controlling device for controlling the sum of DC currents on the DC link side of the power converter units and for controlling an imbalanced component. The switching phase of each of the power converter units is added or subtracted corresponding to the composite value of the output signal of the controlling device for the sum of the DC currents and the controlling means for the imbalanced component. Hence, the imbalanced DC currents of the power converter units due to deviations thereof are suppressed, and the unbalancing factors of the voltages are also suppressed. In addition, the total DC current and the average DC current can be controlled.

Another object of the invention is to provide a controlling method and apparatus for allowing an improvement of voltage controlling characteristics verses influence of DC link side capacitors to be consistent to achieve excellent current control characteristics when DC voltages of power converter units are controlled.

To achieve this object, the present invention provides a voltage source type power converting apparatus including a reference phase signal generating device and phase adding/subtracting device as discussed above. The switching phase of each of the power converter units is controlled corresponding to the reference phase signal.

In addition, the power converting apparatus includes a current controlling device for controlling DC currents on the DC link side of the power converter units corresponding to the addition/subtraction of the switching phase. Moreover, a voltage controlling device controls the voltages of the power converter units. An output signal of the voltage controlling device is applied to an input terminal of the current controlling device. When the DC voltage and the AC voltage that is proportional thereto are controlled, an improvement in the voltage controlling characteristic based on the response of the capacitor on the DC link side to the integral value of the DC current with respect to time and current controlling characteristic can be consistently achieved. In other words, since the internal controlling loop has a current controlling system, the response speed of the current controlling operation can be improved.

Additionally, the current limiting operation is improved. Moreover, the current controlling system, which controls a current that is a differential value of the capacitor voltage, is provided in the voltage controlling loop of the external controlling loop. Thus, the current controlling system of the internal loop also performs the dumping operation (stabilizing operation) for the voltage controlling system of the external loop.

Another object of the present invention is to provide alternatives for a reference phase suitable for controlling the fundamental electric variables so as to control the above-described phases. To achieve this object, the present invention provides a voltage source type power converting apparatus similar to those discussed above. Since the voltage or current of each of the phase-shifting transformers is used as reference phase information, a predetermined controlling operation can be performed corresponding to the electric variables.

A further object of the present invention is to provide alternatives for a reference phase suitable for controlling the fundamental electric variables so as to control the above-described phases, and a reference phase signal generating method and apparatus that has resistances against adverse influence of disturbance (such as instantaneous power failure or voltage drop in power outage) and noise.

To achieve this object, the present invention provides a voltage source type power converting apparatus in which the interlinked flux corresponding to the voltage of each of the phase-shifting transformer is used as reference phase information. The interlinked flux is an integral value of the voltage with respect to time. Therefore, even if there is a disturbance such as instantaneous power failure or voltage drop due to a fault of power transmission line, the reference phase information obtained from fluxes is maintained in a system or a circuit for a long time. Accordingly, the information is not adversely affected by the system fault and noise.

In addition, the reference phase information normally has a phase difference for 90° to the voltage. This reference phase information can therefore be used as the reference phase information.

Another object of the invention is to provide a reference phase signal generating method and apparatus for designating phases to power converter units or adding/subtracting the phases, and for outputting a unit vector used for another observation controlling operation, coordinate transforming operation, and so forth when the power converter units are operated with different phases and the phases thereof are controlled.

To achieve this object, the present invention provides a voltage source type power converting apparatus which includes a device for calculating a unit vector from a voltage vector, a current vector, or interlinked flux vector received from the AC system. The unit vector is used as a reference phase signal.

Since the reference signal is the unit vector, it can be used as a reference axes (vector) of coordinates. For example, the reference signal can be used for an observation controlling operation and a detecting operation such as a coordinate transformation. In addition, the phase designation and the addition/subtraction of the switching phase can be accomplished by vector rotation by sum-of-product arithmetic operations. The conversion to the switching signal can be determined by a sign. Thus, the calculating device is suitable for phase designation, phase addition/subtraction, and so forth.

Another object of the present invention is to provide a reference phase signal generating method and apparatus for designating phases to power converter units or adding/subtracting the phases when the power converter units are operated with different phases and the phases thereof are controlled.

To achieve this object, the present invention provides a voltage source type power converting apparatus including a phase-locked loop corresponding to the phase of the current or voltage received from the AC system or corresponding to the phase of the interlinked flux of the voltage. An output signal of the phase-locked loop is used as a reference phase signal and depending on the output signal (output signal of counter) of the phase-locked loop, predetermined phase differences can be designated to the power converter units.

In addition, based on an interrupt of a pulse to a pulse sequence with a variable frequency (for example, addition/subtraction of an up-down input signal of counter), the switching phase in common with each of the power converter units can be added or subtracted. Thus, suitable phase designation and phase addition/subtraction can be performed.

A further object of the invention is to provide another reference phase signal generating method and apparatus for designating phases to power converter units or adding/subtracting the phases in the case that the power converter units are operated with different phases and the phases thereof are controlled.

To achieve this object, the present invention provides a voltage source type power converting apparatus including a phase-locked loop having a coordinate transforming device for converting an input vector into a vector on synchronously rotating reference frame coordinates, an integrating device, a variable frequency generating device, and a counter. The coordinate transformation is performed corresponding to the count value of the counter. In addition to the above-described operation, a unit vector suitable for a observation controlling operation and a detecting operation such as a coordinate transformation can be obtained. Thus, this apparatus is more suitable for phase designation and phase addition/subtraction.

Another object of the present invention is to provide a reference phase signal generating method and apparatus for generating a reference phase signal to a plurality of power converter units when the power converter units are operated with different phases and the phases are controlled.

To achieve this object, the present invention provides a voltage source type power converting apparatus which obtains single reference phase-shifting information of current, voltage, or the interlinked flux from the AC system. The phase difference of each of the power converter units is added or subtracted to or from the phase of the reference phase-shifting information. The result is used as a reference phase signal applied to each of the power converter units. Thus, the reference phase information can be obtained from the AC system. Consequently, this apparatus is economically advantageous.

A further object of the present invention is to provide another reference phase signal generating method and apparatus for generating a reference phase signal to a plurality of power converter units in the case that the power converter units are operated with different phases and the phases are controlled.

To achieve this object, the present invention provides a voltage source type power converting apparatus in which reference phase information is obtained from each of secondary windings of the phase-shifting transformers. Corresponding to the reference phase information, a reference phase signal applied to each of the power converter units is generated. Thus, the phase differences between secondary windings of the phase-shifting transformers are securely generated in each of the power converter units. Consequently, a desired power converting operation can be accomplished.

Another object of the present invention is to provide a transformer for alleviating higher harmonic currents.

To achieve this object, the present invention provides a voltage source type power converting apparatus which includes phase-shifting transformers whose secondary windings are magnetically-coupled loosely with the common primary winding. Hence, the leakage inductance between each secondary winding, as well as the leakage reactance, becomes large. Consequently, a cross flow of higher harmonic currents among the power converter units through the secondary windings is suppressed.

Other objects and advantages of this invention will become apparent from the detailed description set forth below. It should be understood, however, that the detailed description and specific embodiment are given by way of example only, since various changes and modifications within the spirit and scope of the invention will become apparent to the those skilled in the art from this detailed description.

BRIEF DESCRIPTION OF THE DRAWINGS

FIGS. 3(a)–3(d) illustrate graphs showing wave forms for explaining the operation of the invention applied for a two-level three-phase power converter unit;

FIGS. 4(a) through 4(h) illustrate graphs showing wave forms for explaining the operation of the invention applied for a three-level three-phase power converter unit;

FIG. 13 is schematic diagram showing a reference phase signal generating means according to a tenth embodiment of the invention;

FIGS. 18(a) and 18(b) are schematic diagrams showing a conventional voltage source type power converting apparatus;

DETAILED DESCRIPTION OF THE PREFERRED EMBODIMENTS

Figure 1:
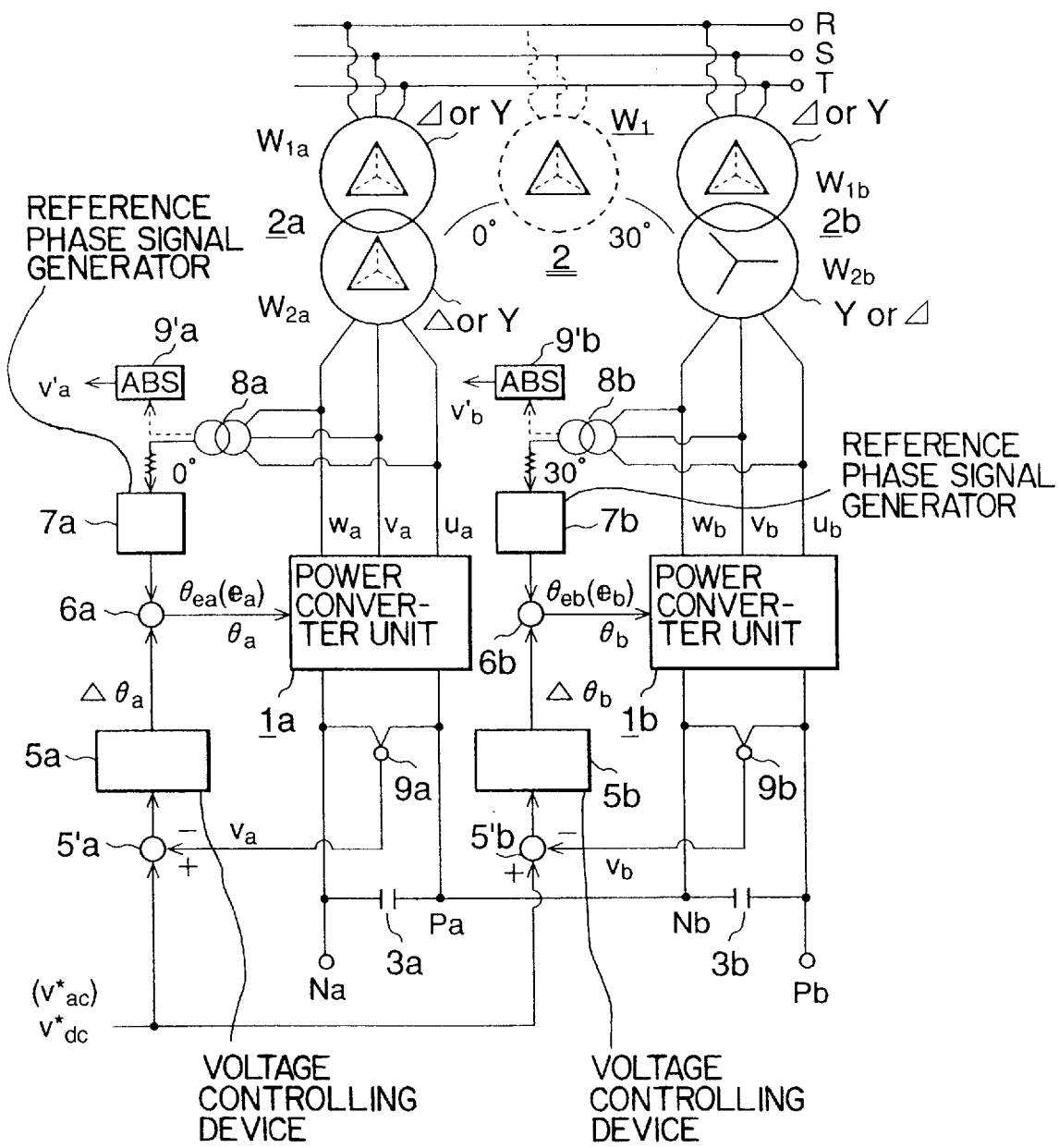
FIG. 1 is schematic diagram showing a voltage source type power converting apparatus according to a first embodiment of the invention.

FIG. 1 illustrates an embodiment of the invention. A phase-shifting transformer 2 or the like, used as a converter, has primary windings W1a and W1b that are connected in parallel, or a common primary winding W1. The phases of the primary winding terminals are the same or substantially the same. The two sets of three-phase transformers 2a and 2b are denoted by solid lines, while the common primary winding W1 is denoted by dotted lines.

The two sets of three-phase transformers are constructed of six single-phase transformers or the like. When the common primary winding W1 is used, one set of three-phase transformer or three sets of single-phase transformers are used. Secondary windings W2a and W2b connected to AC terminals ua to wa and ub to wb of the power converter units 1a and 1b have proper phase differences.

Alternatively, when two sets of three-phase power converter units are used, the secondary windings W2a and W2b have phase differences of 30°. When N sets of three-phase power converter units are used, the secondary windings have phase differences of 60°/N. The phase differences correspond to the winding ratio between the primary windings and the secondary windings and the connections thereof. For example, the phase differences of 30° can be accomplished by the difference between Δ connections and Y connections. In addition, the power converter units 1a and 1b are operated with the above-described phase difference.

Next, the basic operation of the principal portions will be described.

Figure 19A:
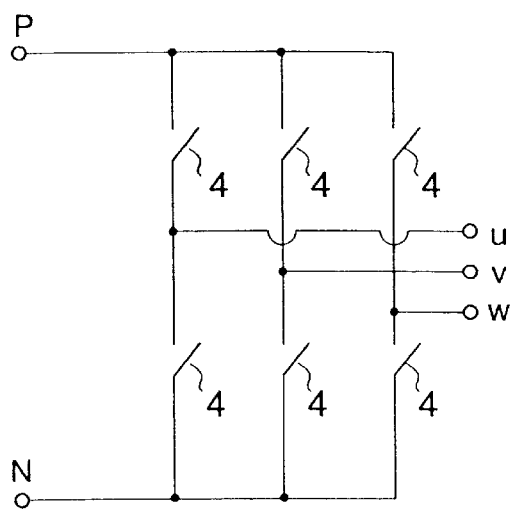
FIGS. 19(a) and 19(b) are schematic diagrams showing a conventional voltage source type power converting apparatus.
Figure 19B:
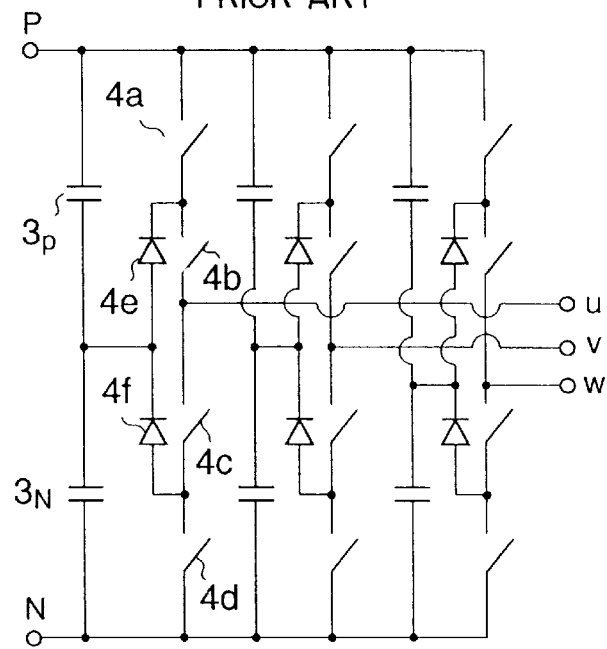
Figure 19C:
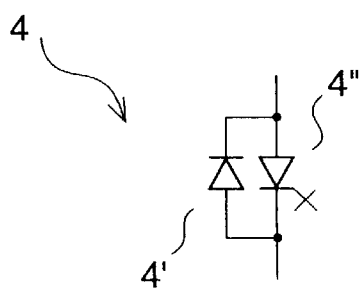
FIG. 19(c) is a circuit diagram of a switch used in the circuits shown in FIGS. 19(a) and 19(b)
Figure 19D:
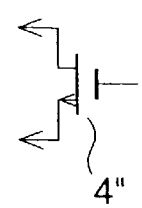
FIG. 19(d) is an example of an active switch element of the switch shown in FIG. 19(c).

With regard to two-level inverters and three-level inverters, such as those shown in FIGS. 19(a) and 19(b), higher harmonics voltage generated by a conventional three-phase power converter unit are represented by the following formulas. In the following formulas, n is a higher harmonic order number.

In the case of a two-level, six-step type inverter:

$$v_n = (2/n\pi) V_{dc} \quad (1)$$

where n=6 m±1, m=1, 2, 3, ...

In the case of a three-level, 12-step type inverter:

$$v_n = ((\sqrt{6} + \sqrt{2})/2n\pi) V_{dc} \quad (2a)$$

where $n = 24m + 1, 24m + 23$ $$v_n = -((\sqrt{6} + \sqrt{2})/2n\pi) V_{dc} \quad (2b)$$

where $n = 24m + 11, 24m + 13$ $$v_n = ((\sqrt{6} - \sqrt{2})/2n\pi) V_{dc} \quad (2c)$$

where $n = 24m + 5, 24m + 19$ $$v_n = -((\sqrt{6} - \sqrt{2})/2n\pi) V_{dc} \quad (2d)$$

where $n = 24m + 7, 24m + 17$

In each of equations (2a), (2b), (2c), and (2d), m=0, 1, 2, ...

There are smaller order numbers in higher harmonics of the three-level, 12-step type than the two-level, six-step type. However, in any type, (6 m ±1)th order higher harmonic voltages are generated. When the reactance of the fundamental wave on the AC system side is denoted by X, the higher harmonic current generated corresponding to the higher harmonic voltage vn is given by the following formula.

$$i_n = v_n/n X \quad (3)$$

When higher harmonic voltages or currents have a phase difference φ against the phase of the fundamental wave, each voltage or each current has a phase difference (nφ) against an n-th order higher harmonic.

When a phase-shifting transformer has a phase difference φ against the fundamental wave, the phase-shifting transformer adds the phase difference φ from a primary winding to a secondary winding for a n-th higher harmonic of a positive sequence (forward phase rotation). In addition, the phase-shifting transformer subtracts the phase difference φ from a secondary winding to a primary winding for a n-th higher harmonic of a positive sequence (forward phase rotation). In this case, the positive sequence higher harmonic is (6 m+1)th order.

On the other hand, the phase-shifting transformer subtracts a phase difference φ from a primary winding to a secondary winding for an n-th higher harmonic of a negative sequence (reverse phase rotation). In addition, the phase-shifting transformer adds a phase difference φ from a secondary winding to a primary winding for an n-th higher harmonic of an negative sequence (reverse phase rotation). In this case, the negative sequence higher harmonic is (6 m−1)th order. Also, the (3 m)th and (6 m)th order higher harmonics are zero phase and they do not take place in a balanced three-phase system.

In other words, the polarity of the phase-shifting operation of the phase-shifting transformer depends on the phase rotating direction. The angle is not multiplied by an order number.

When φ=30°, a higher harmonic current given by the formula (3) flows in the power converter units (1a) and (1b) and the secondary windings W2a and W2b. When the unit b is operated with a delay of 30° against the unit a, the n-th order higher harmonic of the unit b has a phase delay given by the following formula against the n-th order higher harmonic of the unit a. In this case, it is assumed that the phase delay side is denoted as positive.

In the case of positive sequence higher harmonic n=(6 m+1)th order:

$$\psi U = (6m+1)\phi = (180m+30)° \quad (4a)$$

In the case of negative sequence higher harmonic n=(6 m−1)th order:

$$\psi U = (6m-1)\phi = (180m-30)° \quad (4b)$$

The phase delay from a secondary winding to a primary winding by a transformer (corresponding to the phase shifting operation) is given by the following formula.

In the case of positive sequence rotating higher harmonic n=(6 m+1)th order:

$$\psi T = -\phi = -30° \quad (5a)$$

In the case of negative sequence rotating higher harmonic n=(6 m−1)th order:

$$\psi T = +\phi = +30° \quad (5b)$$

Thus, since fifth, seventh, seventeenth, nineteenth, ... order higher harmonics of which m is a odd number have reverse phases on the primary winding side, they are set off. On the other hand, since eleventh, thirteenth, twenty-third, twenty-fifth, ... order higher harmonics of which m is an even number have same phases, they remain as n-th harmonic currents given by the formula (3).

Likewise, when a phase-shifting transformer with a phase difference of a multiple of (60/N)° and N sets of power converter units with the same phase differences are used, (6 Nm±1)th order higher harmonics remain. The other higher harmonics disappear. In addition, a higher harmonic current that flows on the secondary winding side but disappears on the primary winding side just circulates between the secondary windings and between the power converter units. Thus, the current does not flow in the common primary winding and the AC system. At this point, the leakage inductance between the secondary windings effectively reduces the higher harmonic current that circulates. When the common primary winding is used, a higher harmonic voltage with the same order as the current that disappears in the primary winding does not appear in the primary winding. When the primary windings are connected in parallel, and when the voltages are composited (among terminals R, S, and T and systems R, S, and T), the higher harmonics disappear.

Likewise, when M sets of single-phase power transformer units are used, phase-shifting transformers with phase differences of multiples of $(180/M)°$ are used.

In the above-described basic construction, it is not necessary to connect the primary windings in series to composite vectors of AC voltages of power converter units and to set off higher harmonics voltage. Thus, since the windings can be connected simply, the apparatus of the present invention is much more economical and practical than the conventional apparatus. This advantage of the present invention is realized, in particular, when the primary windings that require insulation leads and connections are connected to a high voltage system (for example, a power system).

In addition, since each of the power converter units is operated corresponding to the phase of the fundamental wave of each of the secondary windings of each of the phase-shifting transformer, power, currents, and voltages of the power converter units are balanced. Thus, the terminals on the DC link side can be easily connected in series. Consequently, a high DC link voltage can be accomplished. In addition to high voltages of primary windings of transformers on the AC system side, the present invention can be suitably applied for a DC link type system unit and a DC power transmission unit. In other words, transformers for converters and high-voltage insulation transformers are integrated.

Next, with reference to FIG. 1, the controlling operations for currents, voltages, and power that are fundamental electric variables will be described. To control such fundamental electric variables, corresponding to phase differences of the power converter units, the switching phases of the power converters are added or subtracted. That is, although the voltage source type power converters are PWM controlled, according to that embodiment of the present invention, a predetermined phase controlling method is used to reduce the number of times that the switching operation occurs, and thus improve the efficiency of the units. However, according to the present invention, the use of the PWM controlling operation is not excluded.

First, as the reference of the phase of the AC system, voltage, current, or an interlinked flux which is an integrated value of the voltage, is used. Hence, the phase of a voltage, current, or the interlinked flux of the AC system is selected as a reference phase, and devices 8a and 8b for detecting the reference phase (such as current detecting devices, voltage detecting devices, or devices for detecting the number-of-interlinked-fluxes) are provided. In addition, devices 7a and 7b for generating reference phase signals Θea and Θeb, which correspond to the reference phase, are provided. The reference phase signals Θea and Θeb have phase differences equal to the phase differences of the secondary windings of the above-described transformers. Instead of the reference phase signals Θea and Θeb, unit vectors ea and eb such as a voltage vector, a current vector, or a number-of-interlinked-fluxes vector can be used (in FIG. 1, a symbol of which part of e is largely represented is used). In other words, instead of the reference phase signals Θea and Θeb, any phase information can be used.

The unit vectors can be used for an observing operation and a controlling operation such as a coordinate transformation. The interlinked flux is obtained by integrating the detected voltage. Since the interlinked flux has a phase difference of 90° against the voltage, it can be substituted with the voltage. Moreover, since the interlinked flux is an integrated value of the voltage, it has a resistance against a voltage fluctuation (due to a power outage), lightning surge, and noise.

In addition, phase adding/subtracting devices 6a and 6b are used to add or subtract the switching phase of a power converter corresponding to the reference phase signal Θea and Θeb. ΔΘa and ΔΘb are phases to be added or subtracted. Each of the power converter units is controlled by a composite value of the reference phase signals Θea and Θeb and the added or subtracted phase signals ΔΘa and ΔΘb. When the reference phase signals are unit vectors ea and eb, they are represented by $[\sinΘ, \cosΘ]^T$ that is a value of which two orthogonal components (with a phase difference of 90°) are divided by absolute values.

Thus, the arithmetic operations are executed by the phase adding/subtracting devices 6a and 6b and the devices 7a and 7b that generate reference phase signals. To add or subtract a phase for a unit vector, the following transform matrix is multiplied from the left. Thus, the vector is rotated by ΔΘ (the phase is advanced). When ΔΘ is negative, the vector is reversibly rotated (the phase is delayed).

[Formula 1] (6)

$$\begin{bmatrix} \cosΔθ, & -\sinΔθ \\ \sinΔθ, & \cosΔθ \end{bmatrix}$$

The phase adding/subtracting devices 6a and 6b can be used to control the fundamental electric variables as will be described in the following.

First, the case in which the DC link voltage is controlled will be described. In this case, voltage detecting devices 9a and 9b (or AC voltage detecting devices 9'a and 9'b that have a proportional relation) and voltage controlling devices 5a, 5'a, 5b, and 5'b that compare output signals va and vb (or v'a and v'b) of the voltage detecting devices 9a and 9b with a command value v*dc (or v*ac), are provided. The voltage controlling devices may be a PI (proportional and integral) controlling device or a PID (proportional, integral, and differential) controlling device that has a proper transfer function.

FIGS. 2(a) to 2(d) show vector diagrams for explaining the relation between phase addition/subtraction and fundamental electric variables. FIGS. 3 and 4 show operating wave forms of typical two-level three-phase power converter and three-level three-phase power converter.

In FIGS. 2(a)–2(d), Vs is a rear voltage vector on the AC system side. Vc is a voltage vector at an AC terminal of a power converter unit. Vx is a reactance voltage vector applied to a system reactance of which an AC system side is viewed from a power converter unit including a transformer reactance. Iac is an AC current vector that flows from the AC system to the power converter unit. δ is a phase delay angle of Vc against Vs. α is a phase delay angle of Vc against an AC current Iac. Vc accords with a switching phase (the phase of a sign function S) of the power converter unit.

Figure 2A:
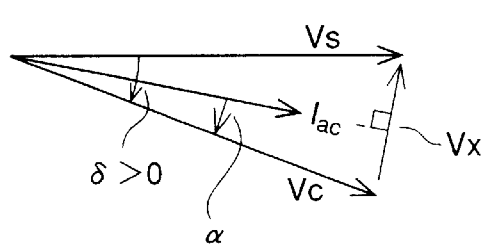
FIGS. 2(a)–2(d) are vector diagrams for explaining the operation of the invention.

FIG. 2(a) shows a case when the phase of the power converter unit side is delayed. In this case, power flows from the AC system to the DC system, and DC link capacitors 3a and 3b, which a disposed in series between terminals Na and Pb as shown in FIG. 1, are charged. Alternatively, the power is applied to a rear DC system (not shown). This mode is referred to as a forward conversion mode (rectifier mode).

Figure 2B:
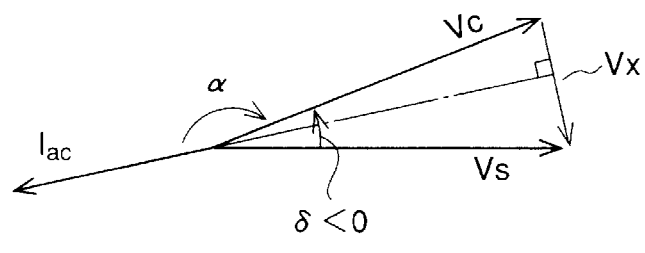

FIG. 2(b) shows a case when the phase of the power converter unit side is advanced. In this case, power flows from the DC system to the AC system and the DC link capacitors 3a and 3b are discharged. Alternatively, the power is applied from the rear DC system (not shown) to the AC system. This mode is referred to as an inverter mode.

Figure 2C:
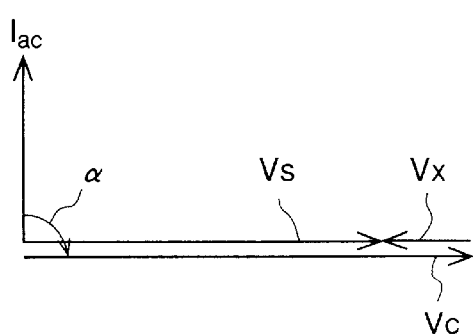

FIG. 2(c) shows a case when the voltages have the same phase, the voltage on the power converter unit side is higher than the AC system rear voltage, and a current that flows to the power converter unit has a phase which is advanced from the phases of the voltages. This mode is referred to as reactive current supply mode (capacitive mode). In this mode, the system voltage is raised.

Figure 2D:
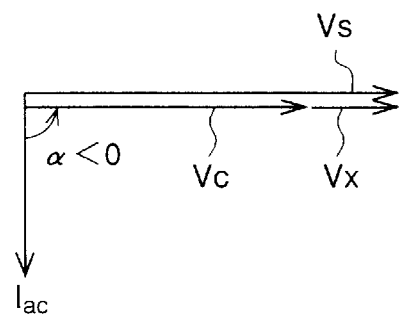

FIG. 2(d) shows a case when the voltages have the same phases, and the voltage on the power converter unit side is lower than the AC system rear voltage. In this case, the current that flows in the power converter has a phase with a delay against the phase of the voltages. This mode is referred to as reactive current consumption mode (inductive mode). In this mode, the system voltage is lowered. In the reactive current supply mode and the reactive current consumption mode, it is not necessary to supply the DC power from the terminals Na and Pb on the DC link side. These modes are operated corresponding to charging and discharging voltages of the DC link capacitors 3a and 3b.

To raise the voltage on the power converter side, as shown in FIG. 2(c), the phase on the power converter unit side is temporarily delayed and the DC link capacitors are charged. In contrast, to lower the voltage on the power converter side, as shown in FIG. 2(d), the phase on the power converter unit side is temporarily advanced and the DC link capacitors are discharged. In other words, by adding/subtracting the phase a of the voltage reference (namely, the phase a of the current reference), the active power (active current) can be controlled. By varying the active power (active current) (namely, the voltage), the reactive power (reactive current) is dependently controlled. The added/subtracted phases ΔΘa and ΔΘb are obtained by adding/subtracting the phase δ of the voltage reference or the phase a of the current reference.

Next, the operational characteristics of a two-level three-phase power converter will be described. FIGS. 3(a) through 3(d) show operating wave forms, with iu being a u-phase AC current and Su being a sign function that represents the switching polarity of phase u. By multiplying Su by a DC voltage (Vdc/2), an AC terminal voltage (proportional to the phase voltage VC and has the same phase) is obtained. DC line current idcu flows as a switched result against a u-phase AC current, and is the same as iuSu. A DC current idc is obtained as a result of synchronous rectification of each phase current and given by the following formula. K1 is a proportional constant. Ip is an AC current peak value, and Idc is a DC current average value. Accordingly, $$i\,dc = (iu\,Su + iv\,Sv + iw\,Sw)/2 \quad (7)$$

$$I\,dc = Ki\,Ip\,\cos\alpha \quad (8)$$

That is, the DC current is proportional to the product of the AC current and cosine of the control angle α. The DC current is controlled corresponding to the control phase angle a to the AC current. It is clear from the operating wave forms that the DC current can be controlled corresponding to the phase of the AC current.

When a loss is omitted, the DC power is equal to the AC power. When the proportional coefficient Kv of the DC voltage and the AC voltage is denoted by Kv, the following formulas are obtained.

$$\begin{aligned} P &= (VcVs/X)\sin\delta \quad (9) \\ &= (KvVdcVs/X)\sin\delta = IdcVdc \end{aligned}$$

$$\text{Thus, } Idc = (KvVs/X)\sin\delta \quad (10)$$

Thus, I dc=(Kv Vs/X)sin . . . (10) Accordingly, the DC current is proportional to the product of the rear voltage Vs of the AC system and sine of the switching phase delay angle (load angle) δ of the power converter unit. In addition, the DC current can be also controlled corresponding to the switching phase δ of the power converter unit against the AC system voltage. Thus, the DC current can be controlled corresponding to the phase of the AC current.

Next, the operating characteristics of a three-level three-phase power converter unit will be described. In the three-level three-phase power converter unit, along with positive and negative polarities at AC terminals, there is a "0" voltage that is intermediate therebetween. Corresponding to a phase current iu shown in FIG. 4(a), a switching function Su3 is shown in FIG. 4(b). The switching function Su3 is represented by ½ of the sum of sign functions Su1 and Su2 shown in FIGS. 4(c) and 4(d). $\Theta_0$ is a period of which only the intermediate voltage side switch is turned on. The phase difference between the intermediate time point of Su3 and the zero point of the phase current is a delay angle α of the switching phase (the phase of phase voltage of the power converter) with respect to the AC current. In FIG. 4(e), iuSu3 is a positive/negative DC line current by switching the u-phase current.

Thus, the three-phase composite DC current idc (instantaneous value) is given by the following formula.

$$\begin{aligned} Idc &= (1/2)\Sigma i_j S_{j3} \quad (11) \\ &= (1/2)(i_u S_{u3} + i_v S_{v3} + i_w S_{w3}) \\ &= (1/4)\{i_u(S_{u1} + S_{u2}) + i_v(S_{v1} + S_{v2}) + i_w(S_{w1} + S_{w2})\} \\ &= (1/4)(\Sigma i_j S_{j1} + \Sigma i_j S_{j2}) \end{aligned}$$

$\Sigma\,i_j\,S_{j1}$ and $\Sigma\,i_j\,S_{j2}$ have the same wave forms as that shown in FIG. 3(d) and their control phase angles are equivalent to $(\alpha \pm \Theta_0/2)$ as shown in FIGS. 4(f) and 4(g). As shown in FIG. 4(h), the DC current instantaneous value that is the sum of $\Sigma\,i_j\,S_{j\,1}$ and $\Sigma\,i_j\,S_{j2}$ has a wave form of which ripple amplitudes alternately vary.

Thus, the DC current average value Idc is given by the following formula.

$$\begin{aligned} Idc &= (1/2)(\Sigma i_j S_{j1}/2 + \Sigma i_j S_{j2}/2) \quad (12) \\ &= (1/2)K_1 Ip\{\cos(\alpha - \Theta_0/2) + \cos(\alpha + \Theta_0/2)\} \\ &= K_1 Ip\cos(\Theta_0/2)\cos\alpha \end{aligned}$$

That is, the DC current average value Idc decreases to cos $(\Theta_0/2)$ due to the influence of the period $\Theta_0$ of which the intermediate voltage takes place. However, it is the same manner that the DC current average value Idc is proportional to the product of the AC current and cosine of the control phase angle α, and that the DC current average value Idc can be controlled corresponding to the control angle α against the AC current.

In addition, when a loss is omitted, the DC power is equal to the AC power. Thus, it is also the same manner that, when the proportional coefficient between the DC voltage and the AC voltage is denoted by Kv, the relations of the formulas (9) and (10) are obtained. However, due to the influence of the period $\Theta_0$ of the intermediate voltage, Kv of the three-level type is smaller than that of the two-level type by cos ($\Theta_0/2$).

As described above, with reference to the phase of a voltage, a current, or the interlinked flux that is an alternative of the voltage, by adding or subtracting the switching phase, a DC current, a DC voltage, an AC voltage, DC power, and AC power can be controlled. By controlling the AC voltage of the power converter unit and adding/subtracting the switching phase, a reactive current and a reactive power can be controlled. Thus, the fundamental electric variables can be freely controlled.

In a second embodiment of the present invention, the reference phase signals ea and eb are commonly used. In addition, the power converter units 1a and 1b are controlled so that they are not imbalanced.

Figure 5:
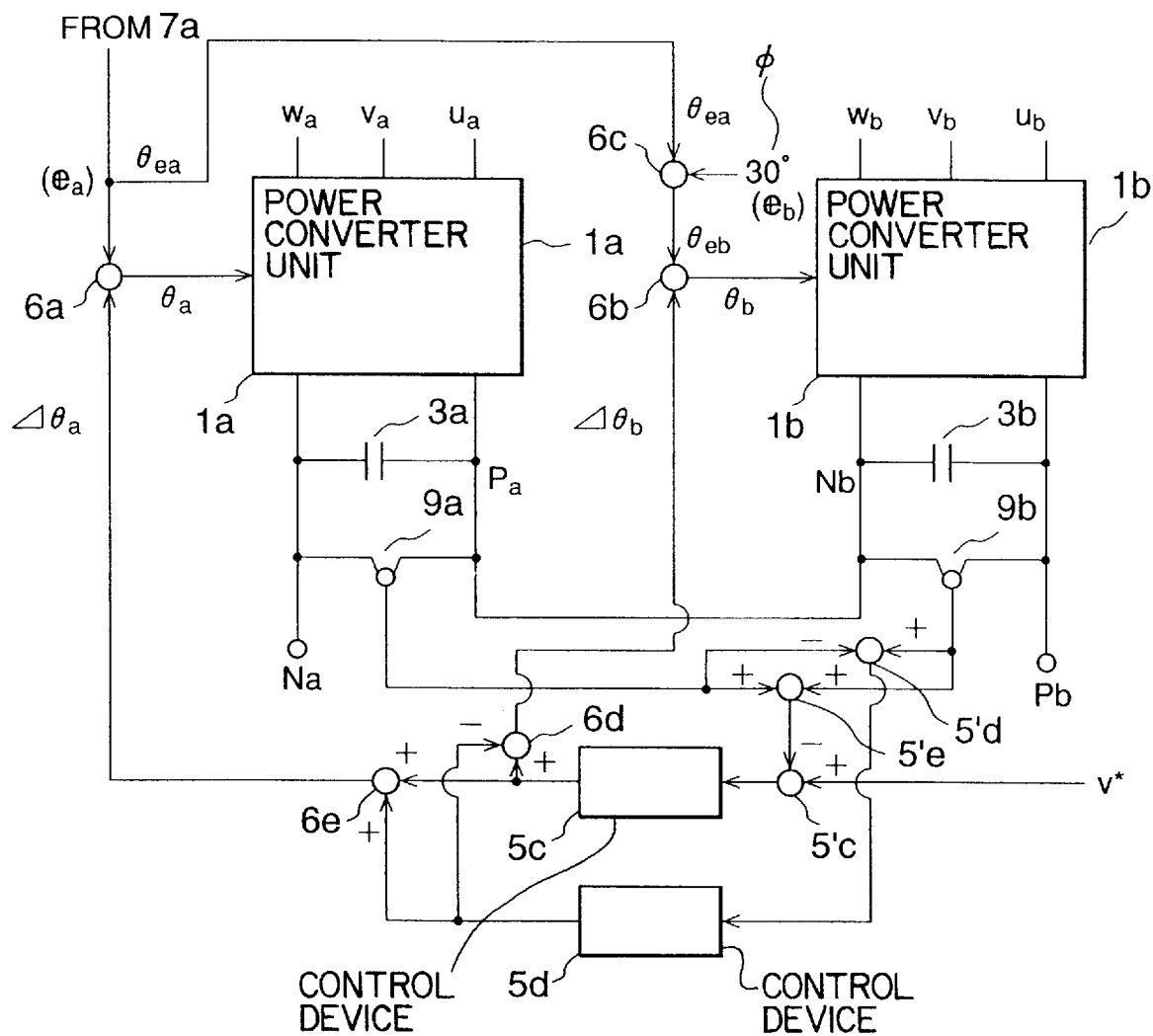
FIG. 5 is schematic diagram showing principal portions of a voltage source type power converting apparatus according to a second embodiment of the invention.

FIG. 5 is a partial block diagram showing a modification of the embodiment of the present invention shown in FIG. 1. A phase adding/subtracting device 6c of which the reference phase signal Θea of a unit 1a side is shared by a unit 1b side. The phase difference adding/subtracting device 6c adds or subtracts the phase difference φ between the power converter units. Phase adding/subtracting devices 6d and 6e are also included, along with voltage adding/subtracting devices 5'c to 5'e. A controlling device 5c controls the sum or the average value of the voltages. The controlling device 5c adds or subtracts the same phase to or from both the units 1a and 1b corresponding to the deviation between the sum of the voltages at the DC link side terminals Na, Pa, Nb, and Pb or the average value thereof and a command value v* so as to control the units corresponding to the command value.

A controlling device 5d is for controlling an imbalanced component of the DC voltages of the units 1a and 1b (the difference between the voltages or the difference against the average value). The controlling device 5d adds or subtracts a phase with an opposite polarity to both the units 1a and 1b corresponding to the voltage difference so as to suppress the voltage difference between both the units 1a and 1b. The main circuit portion shown in FIG. 5 is the same as the main circuit portion shown in FIG. 1. Since both the voltages on the DC and AC sides are proportional thereto, instead of using the DC voltage detecting devices 9a and 9b, the AC voltage detecting devices 9'a and 9'b shown in FIG. 1 may be used.

In the above-described control circuit, the phases of the power converter units 1a and 1b are added or subtracted corresponding to a composite value of the sum voltage controlling error and the imbalanced voltage controlling error. Thus, the sum voltage and the imbalanced voltage are separately controlled. Consequently, the required characteristics can be matched with the control response characteristics. Thus, the fluctuations of the characteristics and the voltages due to deviations of the power converter units can be suppressed.

For example, the response speed of the sum voltage, which is the total voltage, can be improved. With respect to the imbalanced voltages, a higher precedence can be designated to the balance accuracy over the response speed. In this case, the sum controlling operation is performed by a PID (proportional, integral, and differential) controlling unit. The imbalanced voltage controlling operation is performed by a PI (proportional and integral) controlling unit.

In a third embodiment of the present invention, unlike the circuit shown in FIG. 1, the DC link side terminals N and P are connected in parallel. In addition, this embodiment has a quick response to vary of DC currents of the power converter units 1a and 1b.

Figure 6:
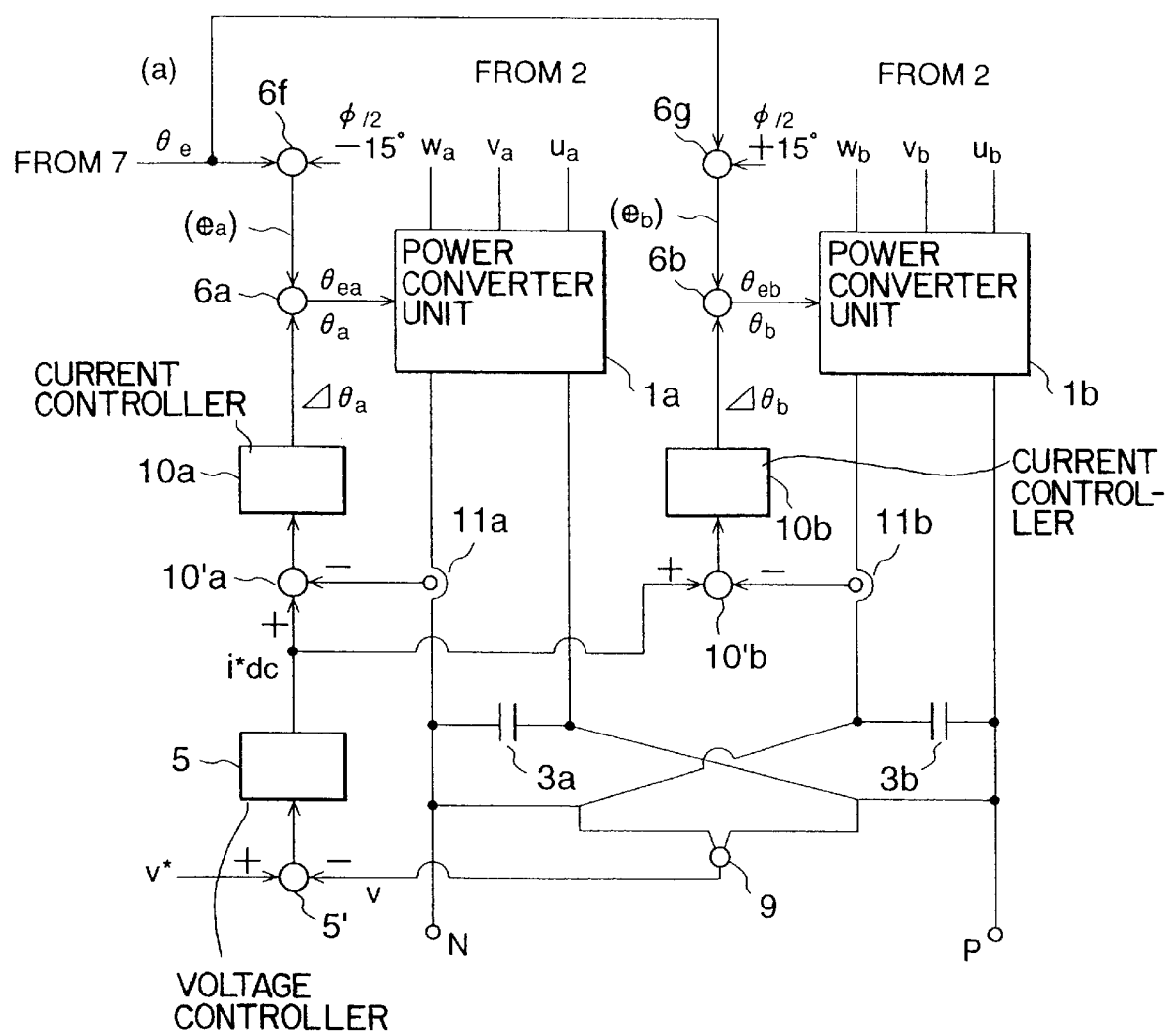
FIG. 6 is schematic diagram showing principal portions of a voltage source type power converting apparatus according to a third embodiment of the invention.

FIG. 6 is a partial block diagram showing a modification of the construction shown in FIG. 1. In this modification, a current controlling operation is performed along with the voltage controlling operation. The circuit includes current controlling devices 10a, 10'a, 10b, and 10'b, and current detecting devices 11a and 11b. Phase adding/subtracting devices 6f and 6g share the common reference phase signal e with both power converter units a and b. The phase adding/subtracting devices 6f and 6g only add or subtract the predetermined phase ±φ/2 difference between both the power converter units. The main circuit portion of this embodiment is the same as the main circuit portion shown in FIG. 1. v* is a command value of the DC voltage or AC voltage.

In the circuit of FIG. 6, a DC current of each of the power converter units is controlled on feedback basis. The DC current is given by the formula (10). A primary delay caused by the leakage impedance has an integral characteristic. Thus, the current controlling means is preferably a P(proportional) controlling unit or a PI (proportional and integral) controlling unit. The current controlling unit, which is located in the internal loop, accomplishes a controlling characteristic that requires a high speed response such as a limitation of an excessive current output signals of the voltage controlling devices 5 and 5' provide in the external loop are command inputs of the current controlling devices. Accordingly, the current controlling loop is stabilized against the external voltage controlling loop since the integrated values of currents by the capacitors 3a and 3b become DC link voltages, and since the current feedback values that are integrated values of the voltages are internally provided.

In a fourth embodiment of the present invention, the power converter units 1a and 1b are controlled corresponding to detected currents so that the power converter units 1a and 1b are not imbalanced.

Figure 7:
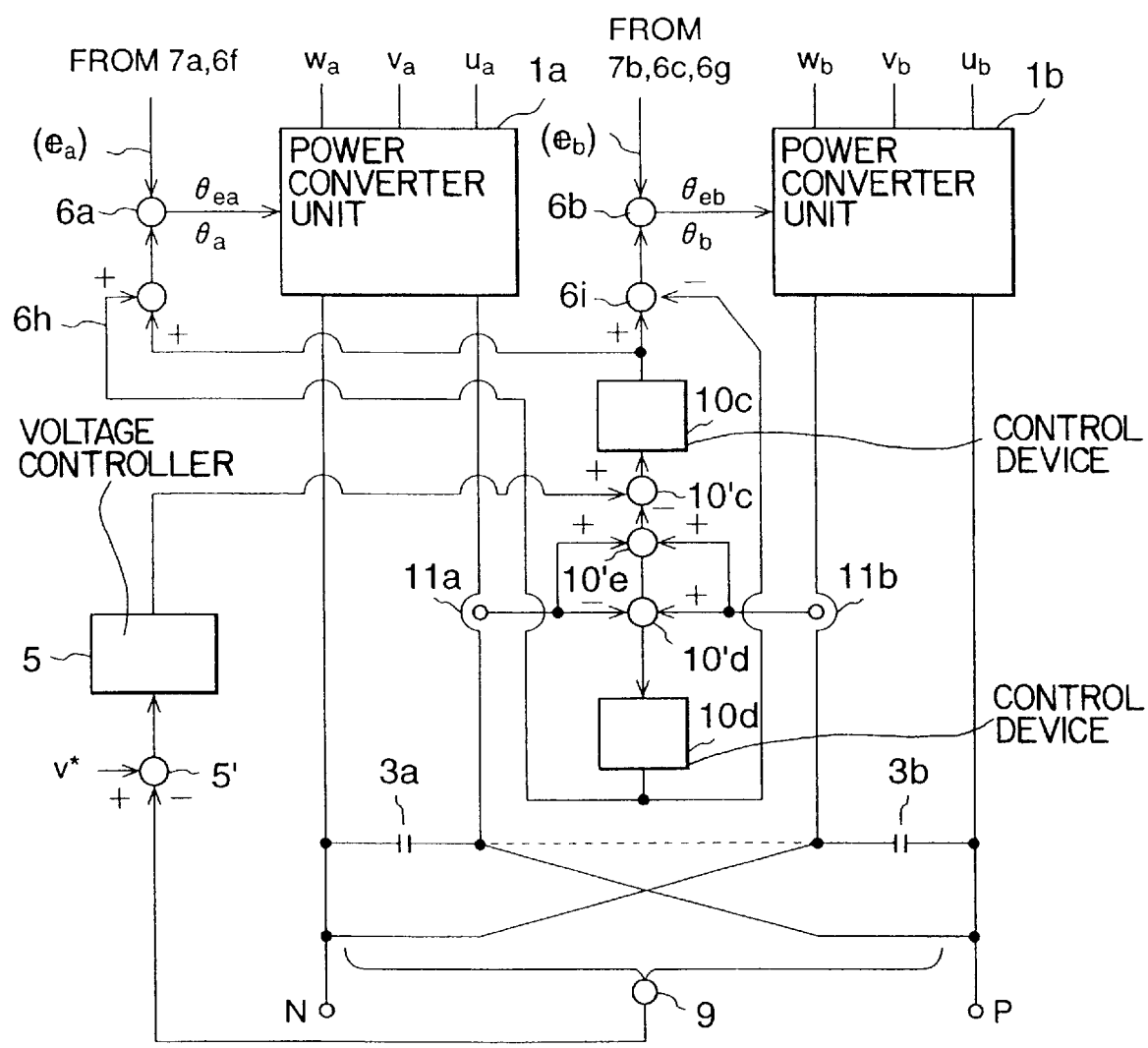
FIG. 7 is schematic diagram showing principal portions of a voltage source type power converting apparatus according to a fourth embodiment of the invention.

FIG. 7 is a partial block diagram showing a modification of the circuit shown in FIG. 1. In the modification, a voltage control loop is disposed in an external loop and a current controlling device with a current unbalance controlling function is disposed in an internal loop. The circuit includes phase adding/subtracting devices 6h and 6i, controlling devices 10c, 10'c, and 10'e for controlling the sum or average value of currents, and controlling devices 10d and 10'd control the difference or imbalanced component of the currents.

The DC link terminals N and P may be connected in series as denoted by dotted lines. In this case, the output signals of the voltage controlling means are applied as commands for the sum or average value of currents. Thus, the voltage controlling operation can be totally conducted. In addition, the sum of the currents is obtained corresponding to the voltage controlling operation. Moreover, the transiently imbalanced currents are suppressed. Thus, imbalanced currents due to deviations of the power converter units 1a and 1b and imbalanced voltages (in the case that the DC link terminals are connected in series) due to the imbalanced currents can be suppressed.

Figure 8:
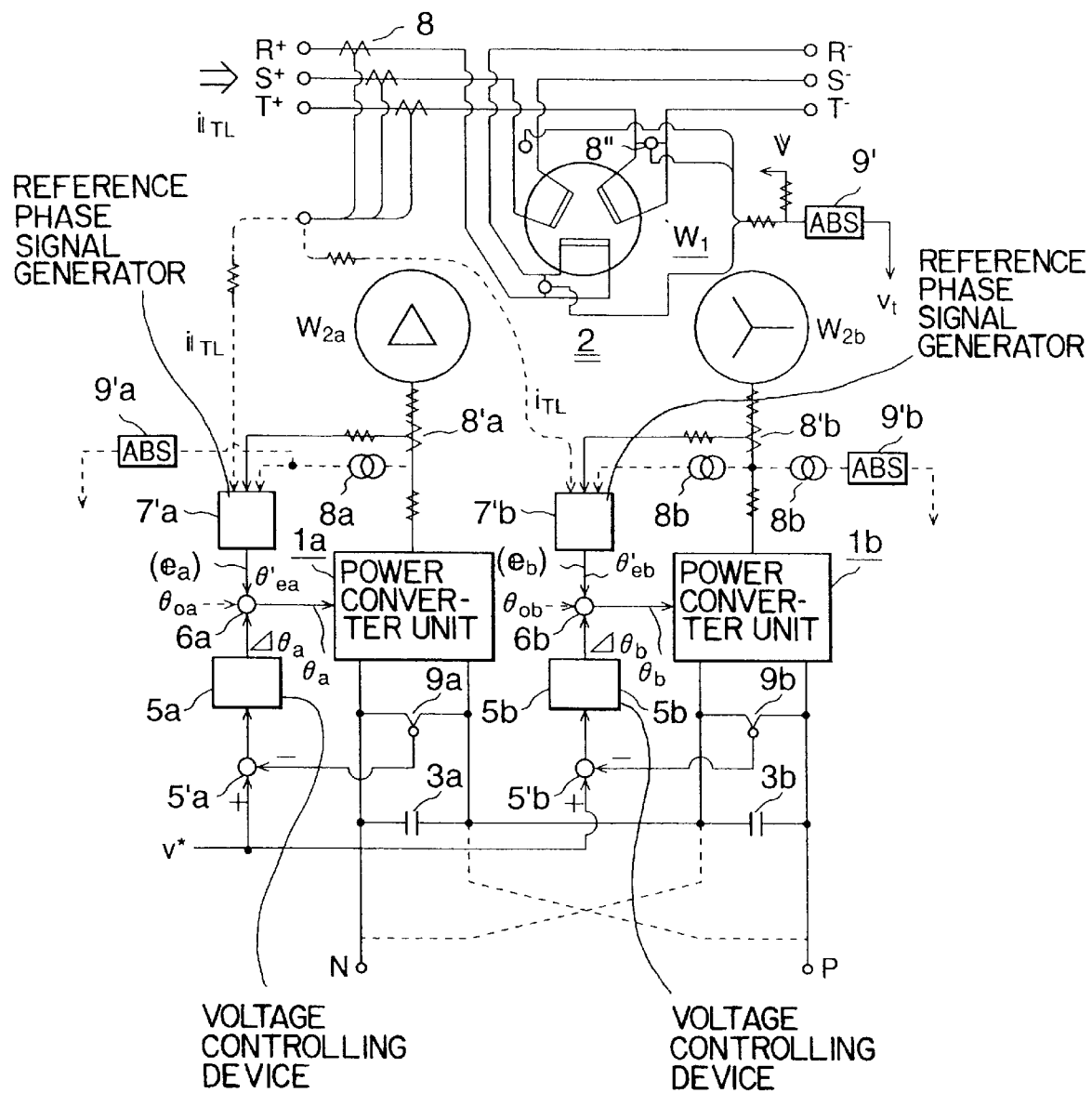
FIG. 8 is schematic diagram showing a voltage source type power converting apparatus according to a fifth embodiment of the invention.

In a fifth embodiment of the present invention, as shown in FIG. 8, unlike with the first embodiment shown in FIG. 1, a common primary winding W1 of phase shifting transformers 2 is inserted in series with lines of an AC system. In this embodiment, the phase of a voltage, a current, the interlinked flux, or the like can be selected as a reference phase. However, when a large current always flows in a main line of a power system as with a main line of a power system, or when a current controlling factor, which relates to a line current controlled by an external system such as except this system, is strong, a switching phase α for a current is controlled corresponding to a line current $i_{rL}$ or a secondary winding current $i_{ac}$ (an AC current of a power converter) that is proportional to the line current $i_{TL}$ so as to properly control a DC current, an DC voltage, an AC voltage, and an AC power (both active and reactive powers). In particular, when a voltage is applied to an AC system for compensating and stabilizing a power system, the operation of the DC voltage or the AC voltage is important. Thus, to control the voltage, it is effective to control the DC currents given by the formulas (8) and (12) with the switching phase α.

To compensate the reactance voltage of the AC system and stabilize the system, it is preferable to supply only a reactive power and adjust a voltage orthogonal to the AC current. Thus, only in a transient state that the voltage is varied, it is preferable to generate the DC current and control the voltage. In other words, to control the voltage, it is preferable to control the DC currents given by the formulas (8) and (12) with the switching phase α. Thus, when only a capacitor is connected to the DC link terminal and thereby the DC current is not continuously supplied, and when the voltage command *v is varied to a ranged value, the DC current becomes 0 (namely, the active power becomes 0). Consequently, the active power becomes 0. As a result, the orthogonal compensation voltage (orthogonally inserted voltage) that does not generate an active power is controlled. In other words, a reactive (capacitive) voltage orthogonal to the line current is controlled. The controlling characteristics are used for stabilizing the AC system. Thus, a very advantageous power system apparatus can be provided.

When the power system is compensated in such a manner, it is not necessary to provide a DC power transmission line. Thus, it is not necessary to raise a DC voltage to a relatively high voltage. Consequently, DC link terminals can be connected in parallel on the DC side as denoted by dotted line in FIG. 8. The portions denoted by dotted lines on the AC side represent types of reference phase information sources. Since they are similar to those in the above-described embodiments, their description is omitted.

As with the embodiments shown in FIGS. 6 and 7, in FIG. 8, when a current controlling device is disposed between a voltage controlling device and a phase adding/subtracting point, high speed response of the current controlling operation and stabilization of the voltage controlling operation can be accomplished. Also, instead of the DC voltage detecting device 9, a DC voltage detecting device 9' may be used.

Figure 9:
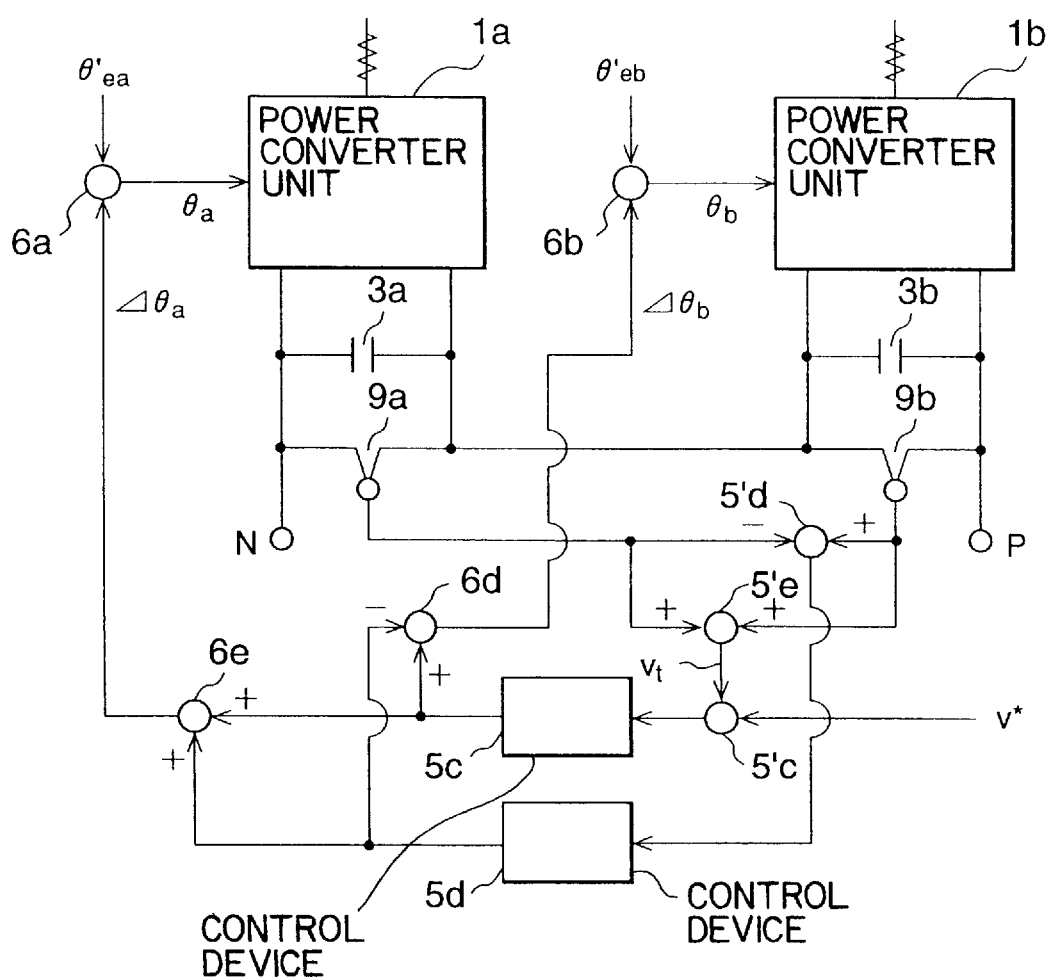
FIG. 9 is schematic diagram showing principal portions of a voltage source type power converting apparatus according to a sixth embodiment of the invention.

The sixth embodiment of the present invention is a modification of the second embodiment shown in FIG. 5. FIG. 9 is a partial block diagram showing a modification of the controlling portion shown in FIG. 8. In the sixth embodiment, the sum or average value of voltages and an imbalanced component are controlled. The operation and effect of the sixth embodiment are the same as those of the embodiment shown in FIG. 5.

That is, in the circuit shown in FIG. 9, when current controlling devices are disposed between the output composite points 6e and 6d and the phase adding/subtracting points 6a and 6b of the voltage controlling devices as shown in FIGS. 6 and 7, the high response of the current controlling operation and the stabilization of the voltage controlling operation can be accomplished.

As described above, when each of the voltage source type power converting apparatuses described in the first to sixth embodiments is applied for power system equipment, the performance thereof can be fully obtained. Next, the features relating to when the apparatus is used for the power system equipment will be described.

In power system equipment, an AC system is a power system. A multiple-phase primary winding is connected in parallel or series with a line of the power system equipment so as to control a voltage or a DC current of a power converter unit. Thus, by the above-described operation, an AC voltage, an AC current, or an AC power of the primary winding can be controlled. At this point, the apparatus can perform the following controlling operations for the power system equipment.

In the case of parallel connections as in the embodiment shown in FIG. 1, the following can occur:

When a voltage component with the same phase as the system voltage is varied, a voltage with the same phase applied to the system reactance is varied and thereby an orthogonal current is varied. Thus, a reactive current and a reactive power are controlled.

When a voltage component orthogonal to the system voltage is varied, an orthogonal component voltage applied to the system reactance is varied and thereby a current orthogonal to the orthogonal voltage (namely, a current with the same phase) is varied. Thus, an active current and an active power are controlled. This relation can be used to control a DC voltage, an AC voltage, a reactive current, and a reactive voltage. In addition, this relation can be used to control a power that is exchanged through a DC link system.

When a reactive current and a reactive power are controlled, the voltage of the power system can be controlled.

When the voltage at the intermediate point of a power transmission line connected in parallel with the apparatus is added or subtracted, since a line reactance voltage between a transmitting terminal end and the intermediate point, and a line reactance voltage between a receiving terminal and the intermediate point are controlled, the line currents of both side can be controlled, and thereby a power flow between the supplying and receiving terminals can be controlled. In addition, by this operation, the power system can be stabilized.

In the case of serial connections as in the embodiment shown in FIG. 8, the following can occur:

When an AC voltage of the primary winding that is proportional to a DC voltage is varied by controlling the switching phase to the line current, a line reactance voltage is varied and a line current can be controlled. Thus, a power flow between the supplying and receiving terminals can be controlled. By this operation, the power system can be stabilized.

When an AC voltage of the primary winding that is proportional to a DC voltage is varied by controlling the switching phase to the line current, a line reactance voltage can be varied. In other words, the line reactance voltage can be compensated. Thus, in this operation, the power system can be stabilized.

When the ratio of the above-described compensated voltage to the line current is varied, the characteristic of a variable reactance can be obtained. Thus, the variable impedance can be controlled and thereby the power system can be stabilized.

After the primary winding of the apparatus has been inserted, the voltage at the receiving terminal side is adjusted as described in 2-1 to 2-3. In other words, the voltage on the receiving terminal side can be controlled. When it disposed between the supplying terminal and the power generator, the voltage at the supplying terminal can be adjusted.

As described above, various effective features are provided corresponding to the power converting apparatus of each of the embodiments of the invention.

Figure 10:
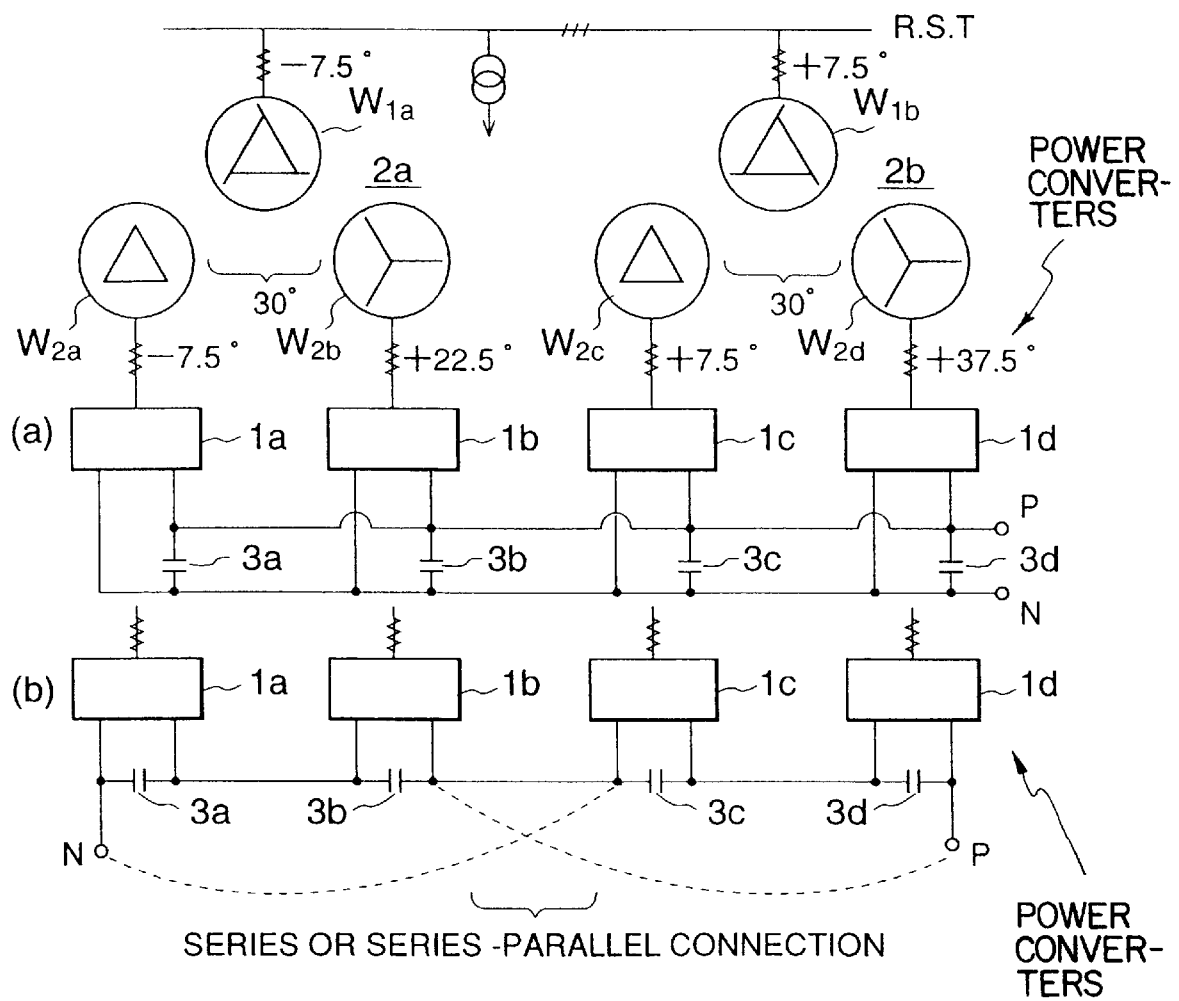
FIGS. 10(a) and 10(b) are schematic diagrams showing a voltage source type power converting apparatus according to a seventh embodiment of the invention.

FIGS. 10(a) and 10(b) are block diagrams showing a seventh embodiment of the invention. In the seventh embodiment, the number of power converter units is further increased so as to further reduce higher harmonics.

The circuit of FIG. 10(a), in which the DC link terminals are connected in parallel, includes power converter units 1a to 1d. W1a is a primary winding of a phase-shifting transformer 2a, and W1b is a primary winding of a phase-shifting transformer 2b. W2a and W2b are secondary windings of the phase-shifting transformer 2a. W2c and W2d are secondary windings of the phase-shifting transformer 2b.

Alternatively, FIG. 10(b) shows the case when the DC terminals are connected in series. Dotted lines of FIG. 10(b) represent the case that DC link terminals are connected in series-parallel.

In FIG. 10(a), the primary windings W1a and W1b are connected in parallel. However, a partial phase-shifting winding or a phase-shifting tap is disposed in each of the primary windings W1a and W1b so that they have phase differences of 7.5° (relative phase differences of 15°). Thus, even in A connections, a phase voltage against line voltages is shifted for 7.5°. On the other hand, the secondary windings of the same transformer have phase differences of 30° by the Y-Δ connections. Thus, the phase differences vary from the AC system to the secondary winding terminals for every 15°.

Consequently, there are four types of phases. Corresponding to these phases, the power converter units are operated with phase differences of 15°. The method for operating the power converter units with phase differences is the same as that of the embodiment shown in FIG. 1. Thus, only (24 m±1)th order higher harmonics remain. (6 m±1)th and (12 m±1)th order higher harmonics do not appear in the AC system. Alternatively, the primary windings can be commonly used and four secondary windings can be provided. In this case, the secondary windings have phase differences of 15°. The connecting method of which only the secondary windings have phase differences of 15° is shown in FIG. 11.

In addition, phases can be shifted in various manners. An integer number of three-phase power converter units can be used. Alternatively, an integer number of single-phase power converter units can be used.

Figure 11:
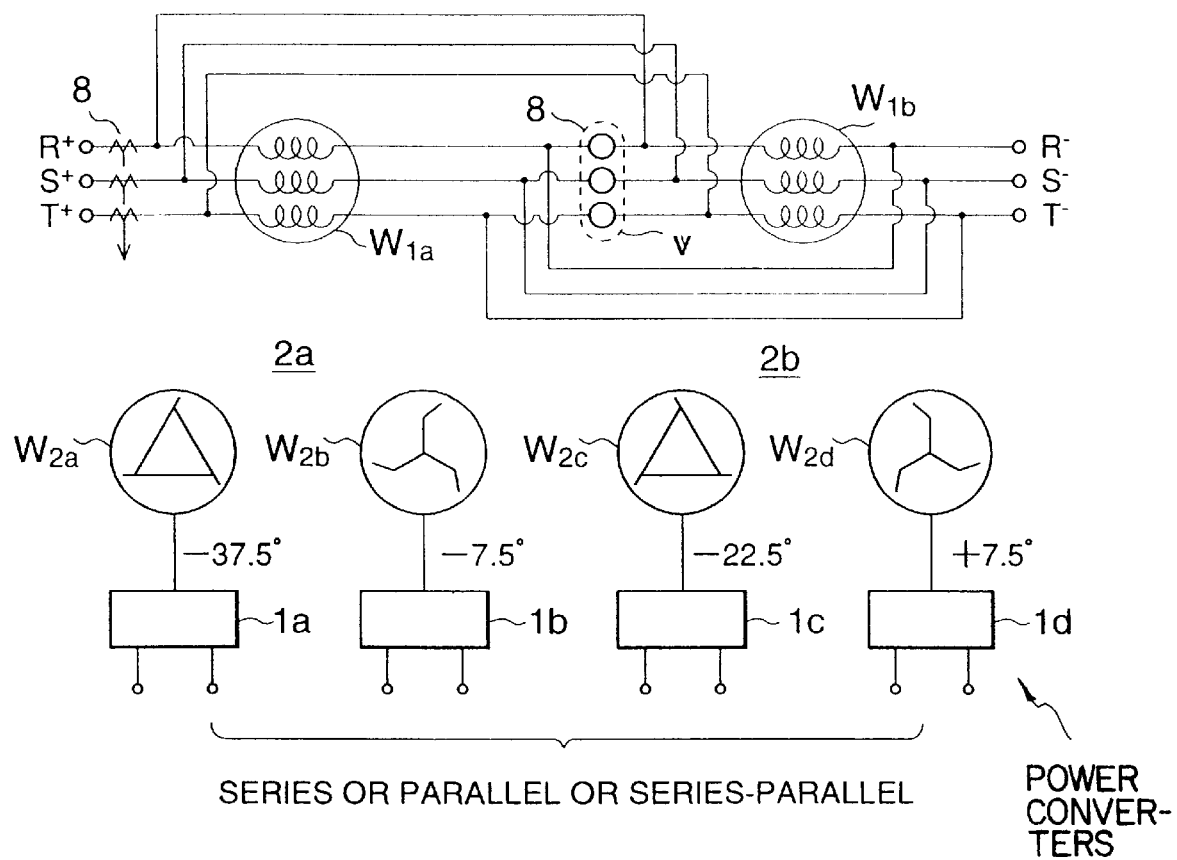
FIG. 11 is schematic diagram showing a voltage source type power converting apparatus according to an eighth embodiment of the invention.

FIG. 11 is a circuit diagram showing an eighth embodiment of the present invention. In the eighth embodiment, power converter units are connected in series with a power system. As with the construction shown in FIG. 10, the number of the power converter units are further increased so as to further reduce higher harmonics. Two phase-shifting transformers 2a and 2b each have two secondary windings. Primary windings W1a and W1b of the two phase-shifting transformers 2a and 2b are connected in series. The primary windings W1a and W1b are connected in series to AC system lines. In this case, for simplicity, the phase voltages of the primary windings have the same phase. The secondary windings provide predetermined phase differences. In other words, each of the secondary windings has connections for providing phase shifts for 7.5° and Y connections for providing phase shifts for 7.5°. Thus, sets of 0o 7.5° and −30°7.5° (thereby phase differences of 15°) are provided.

In this case, since the primary windings have the same phase, they can be used as a common primary winding. Thus, it is not necessary to perform parallel connections of the primary windings outside the transformers. However, when the capacitance of the transformers becomes large, they may be separated due to a restriction on transportation. These phase-shifting transformers can be applied to the case that they are connected in parallel with an AC system.

Figure 12A:
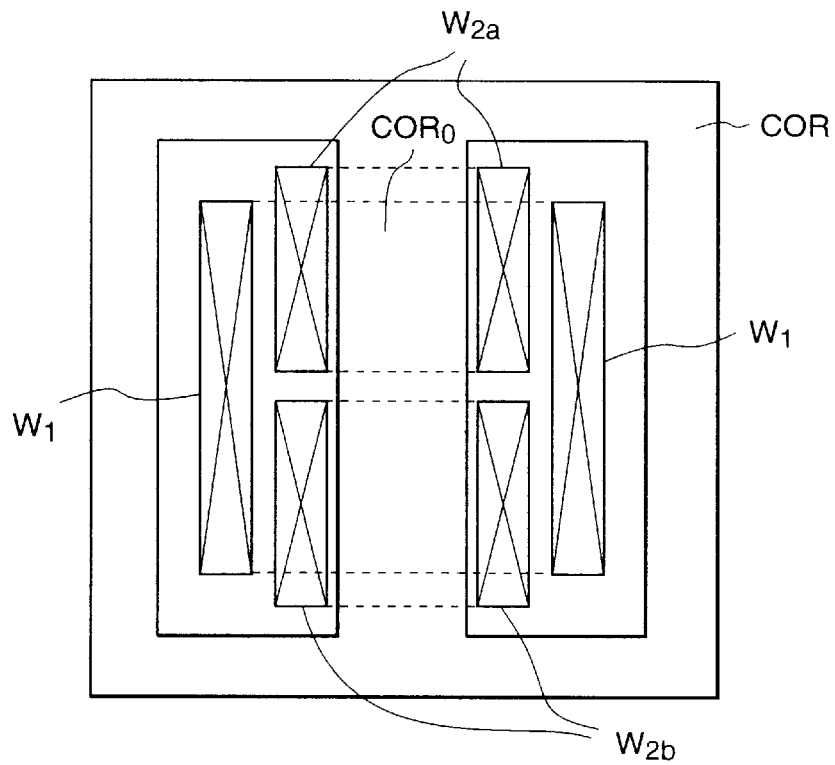
FIGS. 12(a) and 12(b) are schematic diagrams showing a coil layout of a phase shifting transformer according to an ninth embodiment of the invention.
Figure 12B:
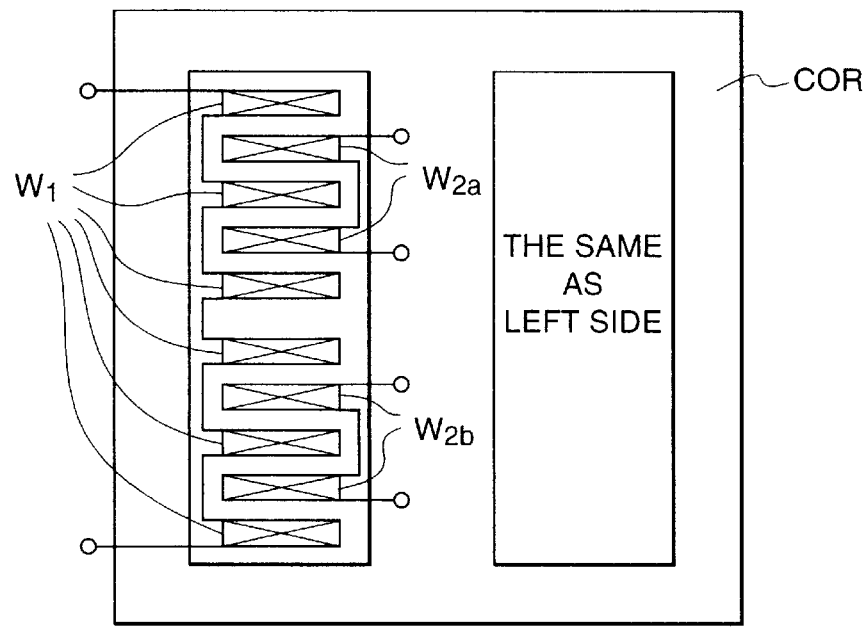

In a ninth embodiment of the present invention, an example of a phase-shifting transformer will be described. FIGS. 12(a) and 12(b) are sectional views showing the construction of a coil of a phase-shifting transformer according to the ninth embodiment of the invention. As shown, COR is a magnetic core, W1 is a primary winding, and W2a and W2b are secondary windings.

As shown in FIG. 12(a), the primary winding W1 may be disposed inside the secondary windings W2a and W2b. Thus, the secondary windings W2a and W2b may be disposed outside the primary winding W1.

FIG. 12(a) shows a conventional concentric winding. Secondary windings are wound in a pipe or tube shape. The secondary windings are separated in the direction of the magnetic core (in the direction of the length). The divided first portion and the divided second portion are designated the secondary winding W2a and the secondary winding W2b. Thus, the secondary windings have a distance each other. Consequently, the leakage inductance and thereby leakage reactance between the windings becomes large. In other words, the windings are loosely magnetic-coupled. Thus, the cross flow of the higher harmonic currents that flow among the power converter units through the secondary windings can be suppressed.

In power converter units with high capacity, the leakage reactance between the secondary windings can be several ten % or more than that of the fundamental wave. Thus, in addition to a very high reactance to (6 m±1)th order higher harmonics, the higher harmonic voltages are decreased to 1/(6 m±1). Thus, the higher harmonic currents can be greatly reduced.

On the other hand, after the secondary winding terminals are connected, they have phase differences to the fundamental wave. However, from a view point of each phase of a unit transformer, the phases of the secondary windings are the same and the VAs thereof are the same. Thus, both the secondary windings operate in the same manner against the fundamental wave. Consequently, the ampere turns of the secondary windings are the same. The sum of the ampere turns accords with the ampere turn of the primary winding. In the current distribution with respect to the distribution of the cross section of a wire, it is clear that it is the same as the conventional current distribution. Thus, the leakage inductance between the primary winding and the secondary windings against the fundamental wave is small as with the conventional circuit. Thus, a convenient effect of which only the higher harmonic currents are suppressed is obtained.

FIG. 12(b) shows a cross-sectional view of a group of spirally wound coils connected in series typical, as in an alternate winding layout. The operation and effect against higher harmonics of the construction shown in FIG. 12(b) are the same as those of the construction shown in FIG. 12(a).

Next, with reference to FIGS. 13(a) to 13(c), a reference phase signal generating device according to a tenth embodiment of the present invention will be described in detail. In FIGS. 13(a) to 13(c), i, v, λ, e, and Θe are a current vector, a voltage vector, an interlinked flux vector, an unit vector, and a reference phase, respectively. The circuit includes a three-phase-to-two-phase converting device 71, an absolute value outputting device 72, a divider 73, and devices for performing an inverse trigonometric function 74. These devices can be digital devices, analog devices, computer software, or a method for referring to numerical tables.

The three-phase-to-two-phase converting device 71 performs multiplication operations of for example the following transform matrix from the left. The operations performed by the device 71 apply to current, voltage, and the interlinked flux.

[Formula 2] (13)

$$\begin{bmatrix} 2/3, & -1/3, & -1/3 \\ 0, & -1/\sqrt{3}, & 1/\sqrt{3} \end{bmatrix}$$

The absolute value outputting device 72 performs a square root operation for the sum of a square. When the dividing device 73 divides two-phase input signals x and x by absolute values, a unit vector e is obtained. Since the unit vector has a value [sin e, cos e]T, when these inverse trigonometric functions are calculated by the inverse trigonometric function outputting device 74, a reference phase e is obtained.

FIGS. 13(b) and 13(c) show a method for calculating the interlinked flux λ. In FIG. 13(b), it is clear that the interlinked flux λ is obtained by subtracting the resistance voltage drop Ri from the voltage vector v and then integrating the resultant value. In FIG. 13(c), since the resistance voltage drop Ri is normally very small, it is omitted and the voltage vector v is integrated.

Since the interlinked flux is an integrated value of a voltage, it has a resistance against a voltage fluctuation due to a power outage, lightening surge, and noise. Thus, the reliability of the controlling operation is improved.

Figure 14:
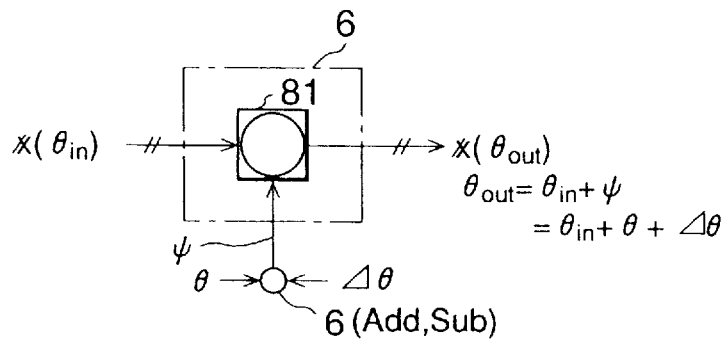
FIG. 14 is schematic diagram showing a vector rotating apparatus according to an embodiment of the invention.

The switching phase of the power converter can be determined corresponding to the reference phase signal that has these phase information. For a plurality of power converter units and a plurality of switch elements, angular adding/subtracting operations or vector rotating operations (namely, phase shifting operations) can be used. The vector rotating operation can be performed by multiplying a transform matrix given by for example the following formula (14) from the left of any vector. This operation is referred to as phase modulating operation. FIG. 14 shows a block diagram of a vector rotating device 81 according to the present invention.

[Formula 3] (14)

$$\begin{bmatrix} \cos\phi, & -\sin\phi \\ \sin\phi, & \cos\phi \end{bmatrix}$$

where φ is any angle to be added or subtracted or a phase to be shifted. After such operations are performed, when a comparison (sign operation) is performed, the switching signal can be easily obtained. In the case that the phase information e itself is used, after a proper addition/subtraction is performed, when values are compared, the switching signal can be obtained.

When the unit vector is used as a reference phase signal, the unit vector can be used for coordinate transformations for use with various measuring operations and controlling operations. For example, since synchronous rotating coordinates that represent a multiple-phase AC with DC binary values are suitable for the controlling and measuring operations, various values can be transformed into synchronous rotating coordinate values. In contrast, synchronous rotating coordinate values can be restored to fixed coordinate values (multiple-phase AC).

Figure 15:
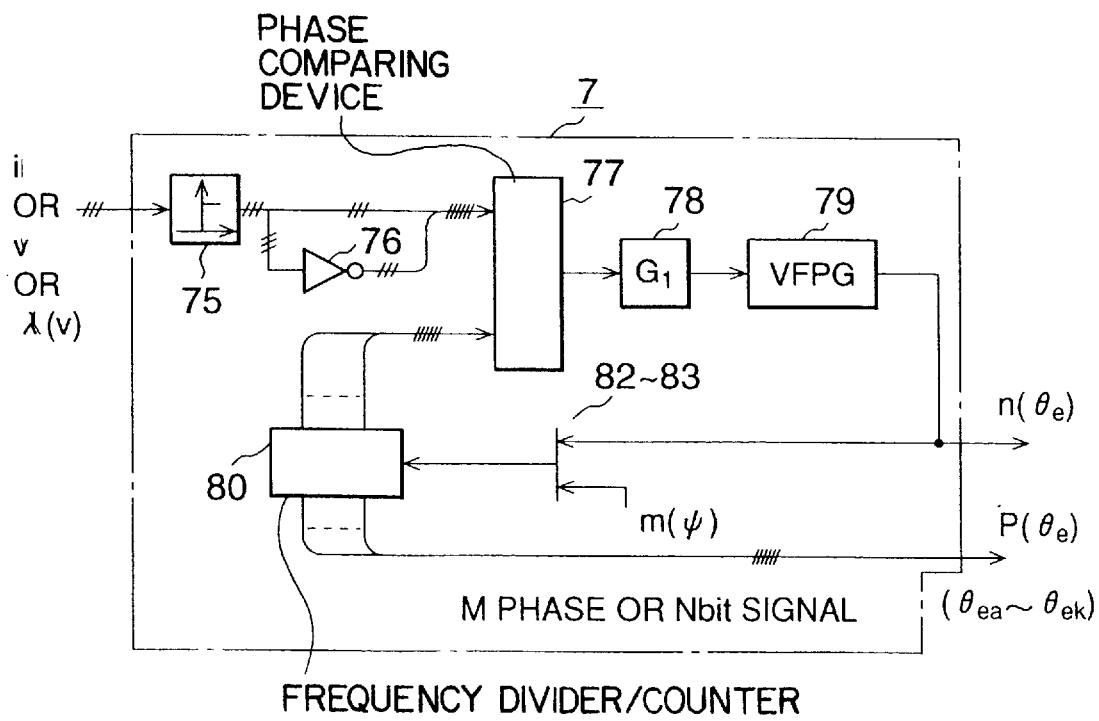
FIG. 15 is schematic diagram showing a reference phase signal generating means according to an eleventh embodiment of the invention.

With reference to FIG. 15, a reference phase signal generating device according to an eleventh embodiment of the invention will be described. In FIG. 15, similar portions to those shown in FIGS. 13(a)–13(c) and 14 are denoted by similar reference numerals. The circuit includes a comparing device 75, an inverting device 76, and a phase comparing device 77 (or phase demodulating means). An arithmetic operation device 78 is an integrating device with a proper integral transfer function GI. The circuit further includes a variable frequency pulse generating device 79. The pulse cumulated value n(e) of the variable frequency pulse generating means accords with a phase e. For example, an output signal n(e) can be converted into a signal group that can be used as a switching signal through a ring counter that accords with the total number of phases of the power converter unit (the number of steps or arms per cycle).

The circuit further includes a frequency dividing device or a counter 80. The count value accords with the phase e. In the case of a ring counter, an output group P(Θe) becomes a reference phase signal group with predetermined phase differences and a common phase or a signal group that can be used as a switching signal. When the transfer function G1 is integrated or it has a primary delay to the integrated value [K/(s(1+Ts))], an output signal of the phase comparing means (77) is filtered. In addition, the input frequency and the output frequency of the variable frequency pulse generating device are controlled so that the phase difference between the output signal of the counter 80 and the output signal of the comparing device 75 becomes 0. Thus, a phase-locked loop (PLL) is formed.

Figure 16:
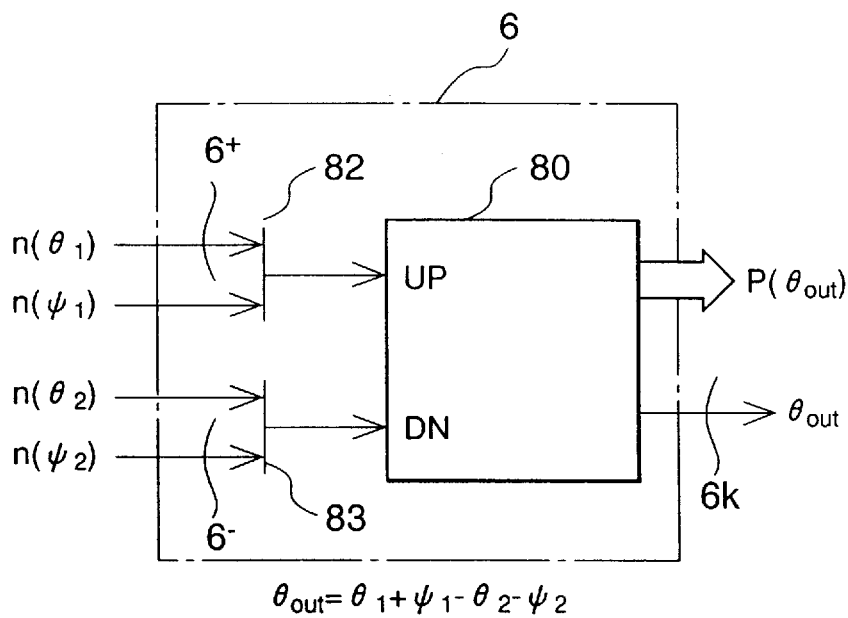
FIG. 16 is schematic diagram showing a pulse adding/subtracting apparatus according to an embodiment of the invention.

In addition, when pulse sequence adding/subtracting devices 82 and 83 are provided, a phase can be shifted or added/subtracted in proportion to an added/subtracted pulse cumulated number m (φ) for each divided angle of which one period is divided by a dividing number. FIG. 16 shows portions corresponding to such pulse sequence adding/subtracting devices 82 and 83. Device 82 can be constructed of a pulse adding device (or OR element) that causes the counter value to increment. Device 83 can be constructed of a pulse subtracting device (or OR element) that causes the counter value to decrement.

With the above-described PLL, not only a reference phase signal, but a multiple-phase signal group and a pulse sequence for a plurality of power converter units can be generated. In addition, a phase can be added or subtracted.

Figure 17:
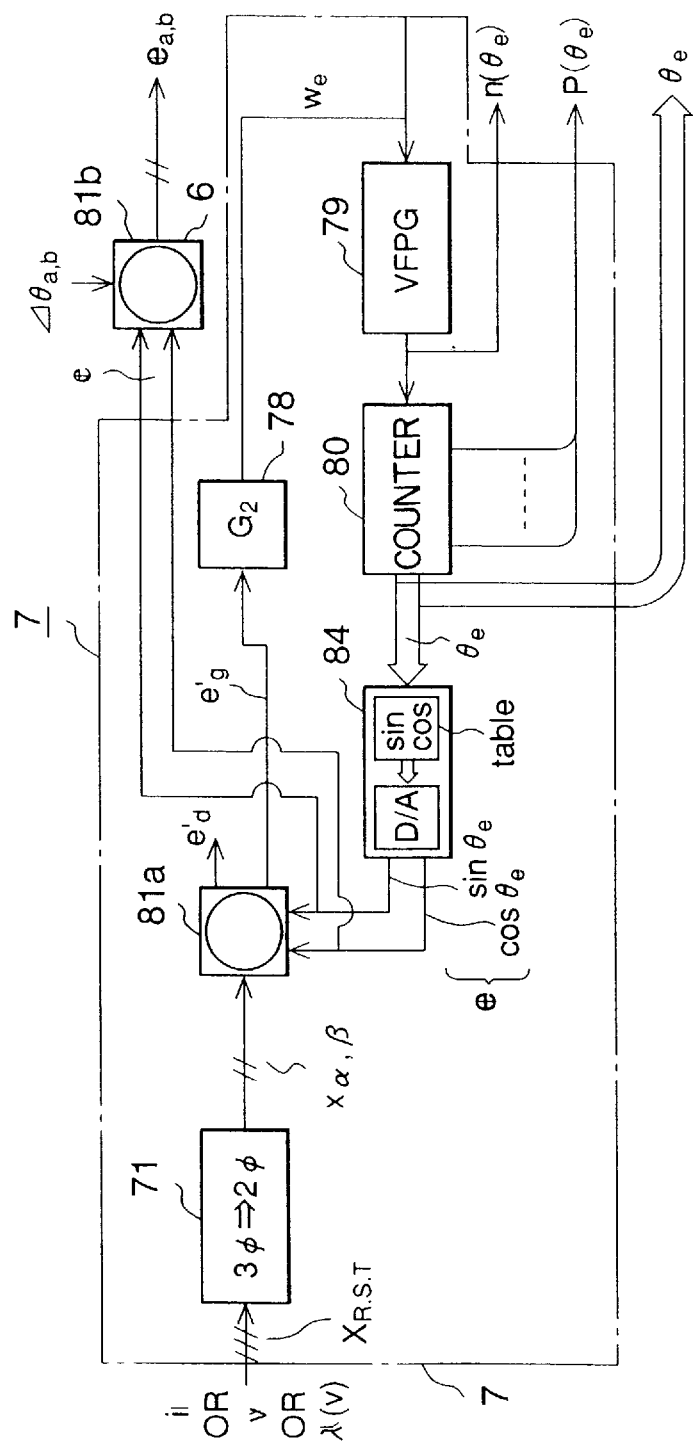
FIG. 17 is schematic diagram showing a reference phase signal generating apparatus according to a twelfth embodiment of the invention.

With reference to FIG. 17, a reference phase signal generating means according to a twelfth embodiment of the present invention will be described. In FIG. 17, similar portions to those shown in the preceding figures are denoted by similar reference numerals.

The circuit includes a coordinate transforming device 81a for a unit vector [sin Θe, cos Θe]ᵀ and a vector rotating device for a phase Θe (that transforms values on the fixed coordinates into values on the synchronous rotating coordinates and operates as the adding/subtracting device 6 with the same phase and outputs unit vectors ea and eb). A vector rotating device 81b is used for ΔΘa and ΔΘb. A digital-to-analog converting device 84 (D/A converter) is also included, as well as a digital output type counter 80.

In FIG. 17, the coordinate transforming device 81a is used instead of the above-described PLL type phase comparing device 77 so as to output a unit vector e corresponding to a current vector i, a voltage vector v, or an interlinked flux λ. In other words, when phases are matched place in the PLL, an axis q output signal e'q of the coordinate transforming device 81a becomes 0. Otherwise, in the PLL, an output signal in proportion to the sine of the phase deviation is obtained. At that point, since a D/A converting device 84 with a trigonometric function table is used to output a unit vector e corresponding to a phase angle e, the counting means is of a digital type. In this case, since output signals e'q and e'd of the coordinate transforming device 81*a* have the phase information similar to the unit vector, the output signals e'q and e'd can be used instead of the unit vector. In addition, as the phase information, any of the digital signal e, the multiple-phase pulse P(Θe), or the pulse sequence n(Θe) may be used. In addition, as with the constructions shown in FIGS. 13(*a*)–13(*c*) and 15, the phase information can be used as a switching signal of the power converter unit.

In the embodiment shown in FIG. 17, in addition to the features of the construction shown in FIG. 15, the unit vector can be obtained. Thus, the embodiment shown in FIG. 17 can have the features of the construction shown in FIG. 13. In the embodiment shown in FIG. 17, since the unit vector can be output, it can be used for coordinate transformations for use with various measuring and controlling operations. In addition, since the phase-locked loop system is used, not only the reference phase signal, but the multiple-phase signal group and pulse sequence for a plurality of power converter units can be generated. In addition, a phase can be added or subtracted.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A voltage source type power converting apparatus for converting power between a multiple-phase AC system and a DC system, said voltage source type power converting apparatus comprising:

a plurality of voltage source type reversible AC-DC power converter units having an AC side terminal and a DC side terminal, said voltage source type reversible AC-DC power converter units adapted to convert AC power to DC power and DC power to AC power, and consisting of a bridge connection of switching devices that have a self-ON-OFF switching function in a forward direction and a current passing function in a reverse direction, said switching devices of said bridge connection being connected between said AC side terminal and said DC side terminal, respectively, each DC side terminal being connected in series or in parallel;

a capacitor or capacitors connected to said DC side terminal or DC side terminals of said voltage source type reversible AC-DC power converter units; and a phase-shifting transformer or phase-shifting transformers comprising a common multiple-phase primary winding or a group of parallel-connected multiple-phase primary windings being connected to said multiple-phase AC system, and comprising a group of multiple-phase secondary windings connected to said AC side terminals of said voltage source type reversible AC-DC power converter units, respectively;

wherein said voltage source type power converting apparatus converts the power between the multiple-phase AC system and the DC system by operating said voltage source type power converter units with phase differences in accordance with the phase differences between said secondary windings of said phase-shifting transformer or phase-shifting transformers, and a harmonic cross current between said voltage source type reversible AC-DC power converter units connected to said secondary windings is decreased by said phase-shifting transformer or phase-shifting transformers.

2. The voltage source type power converting apparatus as claimed in claim 1, wherein said common multiple-phase primary winding or said group of parallel-connected multiple-phase primary windings of said phase-shifting transformer or phase-shifting transformers is connected in series to lines of the multiple-phase AC system.

3. The voltage source type power converting apparatus as claimed in claim 1, said voltage source type power converting apparatus further comprising:

a reference phase signal generator which generates a reference phase signal for each of said voltage source type reversible AC-DC power converter units;

a controller which controls the switching chase of each of said reversible AC-DC voltage source type power converter units based on their respective reference phase signal; and a phase adder/subtractor which adds or subtracts the switching phase signal of each of said voltage source type reversible AC-DC power converter units to or from said respective reference phase signal to control their respective at least one of voltages, currents, and power.

4. The voltage source type power converting apparatus as claimed in claim 1, wherein the DC side terminals of each of said voltage source type reversible AC-DC power converter units are connected in series to each other, said voltage source type power converting apparatus further comprising:

a reference phase signal generator which generates a reference phase signal for each of said voltage source type reversible AC-DC power converter units;

a controller which controls the switching phase of each of said voltage source type reversible AC-DC power converter units based on their respective reference phase signal; and a DC voltage control means which controls the switching phase of each of said voltage source type reversible AC-DC power converter units based on said respective reference phase signal so that a sum of DC voltages of said voltage source type reversible AC-DC power converter units becomes equal to a predetermined command value, and the DC voltages of said voltage source type reversible AC-DC power converter units become balanced.

5. The voltage source type power converting apparatus as claimed in claim 1, wherein the DC side terminals of each of said voltage source type reversible AC-DC power converter units are connected in parallel to each other, said voltage source type power converting apparatus further comprising: a reference phase signal generator which generates a reference phase signal for each of said voltage source type reversible AC-DC power converter units;

a controller which controls the switching phase of each of said voltage source type reversible AC-DC power converter units based on their respective reference phase signal; and a DC current control means which controls the switching phase of each of said voltage source type reversible AC-DC power converter units based on said respective reference phase signal so that a sum of DC currents of said voltage source type reversible AC-DC power converter units becomes equal to a given command value, and the DC currents of said voltage source type reversible AC-DC power converter units become balanced.

6. The voltage source type power converting apparatus as claimed in claim 1, wherein the DC side terminals of each of said voltage source type reversible AC-DC power converter units are connected in parallel to each other, said voltage source type power converting apparatus further comprising: a reference phase signal generator which generates a reference phase signal for each of said voltage source type reversible AC-DC power converter units;

a controller which controls the switching phase of each of said voltage source type reversible AC-DC power converter units based on their respective reference phase signal;

a current controller which controls the switching phase of each of said voltage source type reversible AC-DC power converter units based on said their respective reference phase signal to control DC currents of said voltage source type reversible AC-DC power converter units; and a voltage controller which controls at least one of a DC voltage of said voltage source type reversible AC-DC power converter units, wherein an output signal of said voltage controller is applied to an input of said current controller.

7. A voltage source type power converting apparatus for converting power between a multiple-phase AC system and a DC system, said voltage source type power converting apparatus comprising:

a plurality of voltage source type reversible AC-DC power converter units having an AC side terminal and a DC side terminal, said voltage source type reversible AC-DC power converter units adapted to convert AC power to DC power and DC power to AC power, and consisting of a bridge connection of switching devices that have a self-ON-OFF switching function in a forward direction and a current passing function in a reverse direction, said switching devices of said bridge connection being connected between said AC side terminal and said DC side terminal, respectively, each DC side terminal being connected in series or in parallel;

a capacitor or capacitors connected to said DC side terminal or DC side terminals of said voltage source type reversible AC-DC power converter units; and a phase-shifting transformer or phase-shifting transformers comprising a common multiple-phase primary winding or a group of parallel-connected multiple-phase primary windings being connected to said multiple-phase AC system, and comprising a group of multiple-phase secondary windings being connected to said AC side terminals of said voltage source type reversible AC-DC power converter units, respectively, and further comprising a magnetic core forming a magnetic path and a winding window in which said primary winding and secondary windings are disposed, and said secondary windings being separated in the direction of the magnetic path surrounded with said primary winding and secondary windings for increasing the leakage inductance between said secondary windings;

wherein said voltage source type power converting apparatus converts the power between the multiple-phase AC system and the DC system by operating said voltage source type power converter units with phase differences in accordance with the phase differences between said secondary windings of said phase-shifting transformer or phase-shifting transformers, and a harmonic cross current between said voltage source type reversible AC-DC power converter units connected to said secondary windings disposed in said winding window is decreased by said leakage inductance between said secondary windings.

* * * * *